(12) United States Patent
Floyd

(10) Patent No.: US 11,030,699 B1
(45) Date of Patent: Jun. 8, 2021

(54) BLOCKCHAIN CONTROLLED MULTI-CARRIER AUCTION SYSTEM FOR USAGE-BASED AUTO INSURANCE

(71) Applicant: State Farm Mutual Automobile Insurance Company, Bloomington, IL (US)

(72) Inventor: Matthew L. Floyd, Alpharetta, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 247 days.

(21) Appl. No.: 15/838,054

(22) Filed: Dec. 11, 2017

Related U.S. Application Data

(60) Provisional application No. 62/447,254, filed on Jan. 17, 2017, provisional application No. 62/455,217, filed on Feb. 6, 2017, provisional application No. 62/522,439, filed on Jun. 20, 2017.

(51) Int. Cl.
*G06Q 40/08* (2012.01)
*G06F 16/27* (2019.01)

(52) U.S. Cl.
CPC ............. *G06Q 40/08* (2013.01); *G06F 16/27* (2019.01)

(58) Field of Classification Search
CPC .................................................... G06Q 40/08
USPC ........................................................... 705/4
See application file for complete search history.

(56) References Cited

U.S. PATENT DOCUMENTS

| | | | |
|---|---|---|---|
| 5,351,302 A * | 9/1994 | Leighton | G06Q 20/346 235/379 |
| 6,246,967 B1 * | 6/2001 | Libicki | G01G 19/02 177/25.11 |
| 9,053,469 B1 | 6/2015 | Bohanek et al. | |
| 9,778,653 B1 * | 10/2017 | McClintock | G06Q 10/08 |
| 10,007,826 B2 | 6/2018 | Ebrahimi et al. | |
| 10,223,751 B1 | 3/2019 | Hutchinson et al. | |

(Continued)

OTHER PUBLICATIONS

The future of smart contracts in insurance Nicholas Berry https://www.nortonrosefulbright.com/en/knowledge/publications/88244592/the-future-of-smart-contracts-in-insurance (Year: 2016).*

(Continued)

*Primary Examiner* — William E Rankins
(74) *Attorney, Agent, or Firm* — Armstrong Teasdale LLP

(57) ABSTRACT

A system for generating and managing usage-based contracts using blockchains configured to (i) store an insurance contract for a currently occurring or upcoming trip, where the insurance contract is to insure the driver, passenger, and/or vehicle during the trip, where the insurance contract includes terms, conditions, or other clauses (e.g., mileage limitations, limitations on autonomous vehicle operation, etc.) and is in a blockchain structure, and where several nodes store copies of the insurance contract in the blockchain structure; (ii) receive, from the driver and/or (autonomous) vehicle, a requested modification of one or more terms, conditions, or other clauses of the insurance contract, (iii) transmit the requested modification to an insurance auction network, (iv) receive a response to the request from the insurance auction network; and (v) store the response in a new block in the insurance contract (e.g., a smart contract) to facilitate providing trip insurance in a transparent manner.

21 Claims, 14 Drawing Sheets

(56) References Cited

U.S. PATENT DOCUMENTS

| | | | |
|---|---|---|---|
| 10,430,883 B1* | 10/2019 | Bischoff | G06Q 20/14 |
| 2009/0024419 A1* | 1/2009 | McClellan | G06Q 40/08 |
| | | | 705/4 |
| 2010/0131303 A1* | 5/2010 | Collopy | G06Q 30/0273 |
| | | | 705/4 |
| 2010/0131305 A1 | 5/2010 | Collopy et al. | |
| 2011/0191581 A1* | 8/2011 | Shim | H04L 67/12 |
| | | | 713/158 |
| 2011/0225259 A1* | 9/2011 | Quinn | H04L 67/34 |
| | | | 709/217 |
| 2013/0073864 A1* | 3/2013 | Sarkar | G06F 21/64 |
| | | | 713/189 |
| 2015/0302522 A1* | 10/2015 | Howe | G06Q 40/04 |
| | | | 705/4 |
| 2016/0299918 A1* | 10/2016 | Ford | G06F 21/645 |
| 2017/0011460 A1* | 1/2017 | Molinari | G06F 21/645 |
| 2017/0046652 A1 | 2/2017 | Haldenby et al. | |
| 2017/0046664 A1 | 2/2017 | Haldenby et al. | |
| 2017/0046806 A1 | 2/2017 | Haldenby et al. | |
| 2017/0053460 A1 | 2/2017 | Hauser et al. | |
| 2017/0075877 A1 | 3/2017 | Lepeltier | |
| 2017/0103468 A1 | 4/2017 | Orsini et al. | |
| 2017/0140408 A1 | 5/2017 | Wuehler | |
| 2017/0279774 A1 | 9/2017 | Booz et al. | |
| 2017/0363433 A1* | 12/2017 | Tennent | H04L 67/12 |
| 2018/0018723 A1 | 1/2018 | Nagla et al. | |
| 2018/0096360 A1* | 4/2018 | Christidis | G06Q 20/02 |
| 2018/0181979 A1* | 6/2018 | Frank | G06Q 30/0217 |
| 2018/0343114 A1* | 11/2018 | Ben-Ari | G06F 21/64 |

OTHER PUBLICATIONS

Kehrli, Jerome, "Blockchain 2.0—From Bitcoin Transactions to Smart Contracts Applications," Blockchain 2.0 niceideas.ch, Nov. 22, 2016 (Year: 2016).

Dhaliwal, Shivdeep. Bitcoin Mining, Ethereum Mining, Cloud Mining: 2016 Overview. Coin360. Mar. 30, 2016. (Year: 2016).

Redman, Jamie. "Bitcoin Mining Intensifies During Q4 of 2016." Bitcoin.com. Nov. 14, 2016 (Year: 2016).

Von Haller Gronbaek, Martin. "Blockchain 2.0, Smart Contracts and Challenges", Bird & Bird; Jun. 2016 (Year: 2016).

\* cited by examiner

FIG. 10    Blockchain Participant Network (Miners)

US 11,030,699 B1

BLOCKCHAIN CONTROLLED MULTI-CARRIER AUCTION SYSTEM FOR USAGE-BASED AUTO INSURANCE

RELATED APPLICATIONS

This application is related to co-pending U.S. Ser. No. 15/838,036, filed Dec. 11, 2017 and U.S. Ser. No. 15/838,045, filed Dec. 11, 2017, and claims priority to U.S. Provisional Patent Application No. 62/447,254, filed Jan. 17, 2017, entitled "BLOCKCHAIN SYSTEMS AND METHODS FOR MANAGING USAGE-BASED CONTRACTS," and U.S. Provisional Patent Application No. 62/455,217, filed Feb. 6, 2017, entitled "BLOCKCHAIN SYSTEMS AND METHODS FOR MANAGING USAGE-BASED CONTRACTS," and U.S. Provisional Patent Application No. 62/522,439, filed Jun. 20, 2017, entitled "BLOCKCHAIN SYSTEMS AND METHODS FOR MANAGING USAGE-BASED CONTRACTS," the entire contents and disclosure of which are hereby incorporated by reference herein in their entirety.

FIELD OF THE DISCLOSURE

The present disclosure relates to managing usage-based contracts and, more particularly, to a network-based system and method for generating and managing usage-based contracts using blockchain technologies.

BACKGROUND

Usage-based insurance contracts (also known as trip based insurance) are short-term contracts that allow a driver to pay for insurance as they need it. In many cases, this insurance is based upon the combination of the user and the vehicle. However, as many drivers are no longer being tied to specific vehicles, it has become more difficult to determine the proper insurance for the individual user on a case by case basis. Furthermore, while the usage-based insurance (UBI) may include restrictions on the user, it is not always possible to determine when the user has complied with these restrictions. In some cases, a user may wish to modify already issued insurance to allow for a detour or side trip. There exists a need to collect and collate data about a user and a trip to allow for proper tracking of insurance policies and individuals.

BRIEF SUMMARY

The present embodiments may relate to blockchain based systems and methods for managing usage-based insurance contracts. The platform may include an Insurance Monitoring (IM) computer system associated with a vehicle, a User Based Auto Insurance Management ("UBAIM") system, a plurality of sensors on the vehicle, a plurality of vehicle computer devices associated with a plurality of vehicles configured to act as nodes for a blockchain ledger, and/or an insurer auction network including a plurality of insurer computer devices associated with a plurality of insurers. The IM computer system may be a mobile device associated with the driver and/or a vehicle computer device associated with the vehicle. In some further embodiments, the IM computer system may be separate from the vehicle and be in communication with the vehicle.

The IM computer system may be configured to: (i) receive a user request for trip insurance (such as via wireless communication or data transmission over one or more radio links or digital communication channels), where the user request includes a plurality of information about the user (who may or may not be the driver), the vehicle (which may be an autonomous or semi-autonomous vehicle), and the trip; (ii) transmit the user request to the insurer auction network, where the insurer auction network transmits the request to the plurality of insurer computer devices, which are configured to generate bids based upon the user request; (iii) receive, from the insurer auction network, a plurality of bids (or a selected winning bid) from the plurality of insurer computer devices for trip insurance based upon the user request; (iv) display the plurality of bids (or selected winning bid) to the user; (v) receive a user selection of a bid of the plurality of bids (or a user approval of the selected winning bid); (vi) transmit the user selection (or user approval) to the insurer auction network, where the insurer auction network notifies the insurer computer device associated with the selected bid (or winning bid), which may be the UBAIM server or may be in communication with the UBAIM server; (vii) store an insurance and/or smart contract that includes one or more terms (the terms may include conditions, clauses, vehicle or driver limitations, premiums, discounts, deductibles, endorsements, duties, obligations, etc.) for the trip using a blockchain structure, where the plurality of nodes store copies of the insurance contract, and where in some embodiments, the blockchain based insurance contract may be generated by the UBAIM server, and in other embodiments, the blockchain based insurance contract may be generated by the IM computer system based off of information from the bid and/or the UBAIM server. The IM computer system may further be configured to: (viii) receive, from the driver and/or a vehicle (such as an autonomous vehicle controller), a requested modification of at least one of the one or more terms of the insurance contract; (ix) transmit the requested modification to the UBAIM server; (x) receive a response to the request from the UBAIM server, where the response may include an approval or one or more additional terms; (xi) if the response includes one or more additional terms, display the one or more additional terms to the driver and/or vehicle for approval and wait to receive approval of the one or more additional terms from the driver; (xii) store the modification, the response, the approval, and/or the one or more additional terms in the insurance contract (which may be a virtual or electronic smart contract), in some embodiments, the IM computer system may (a) generate a new block for the insurance contract based upon the requested modification and the response, (b) update the insurance contract with the new block, and/or (c) transmit the new block with the plurality of nodes, where each the plurality of nodes are configured to update their stored copies of the insurance contract with the new block. In other embodiments, the IM computer system may transmit the requested modification and the response to the plurality of nodes, where each of the plurality of nodes are configured to generate a new block based upon the requested modification and the response and update their stored copies of the insurance contract with the generated block. The IM computer system may further be configured to: (xiii) receive sensor information from the one or more sensors associated with the vehicle; (xiv) with customer permission or affirmative consent, compare the received sensor information with the one or more terms (conditions, limitations, clauses, duties, obligations, etc.) of the (electronic and/or smart) insurance contract; (xv) determine whether the driver and/or the vehicle (such as autonomous vehicle) complied with the one or more terms based upon the comparison; (xvi) if the determination is that the driver or autonomous vehicle complied with the one or more terms, the computer device may be further configured to: (a) transmit a notification of driver or autonomous vehicle compliance to an insurance server associated with the insurance contract; (b) generate a new block for the insurance contract based upon the notification of driver or autonomous vehicle compliance; (c) store the notification of driver or autonomous vehicle compliance in the insurance contract; (d) receive an indication of a discount and/or lower premium for the insurance contract from the insurance server; (e) generate a new block for the insurance contract based upon the indication of the discount and/or lower premium; (f) store the indication in the insurance contract; (g) display the indication of the discount and/or lower premium of the insurance contract to the driver including an acknowledgement request; (h) receive the acknowledgement from the driver and/or vehicle; (i) generate a new block for the insurance contract based upon the acknowledgement; (j) store the acknowledgement in the insurance contract; and/or (k) generate a new block for the insurance contract based upon the notification, the indication, and/or the acknowledgement; and/or (xvii) generate a new block for the (electronic or smart) insurance contract that includes sensor information on a periodic basis.

The present embodiments may relate to systems and methods for managing usage-based insurance. A computer system, as described herein, may include a vehicle controller or a mobile computer device. The computer device may be configured to (i) receive a user request for trip insurance, where the user request includes a plurality of information about the user, the vehicle (which may be an autonomous vehicle), and the trip (such as an upcoming, approaching, or impending trip using the vehicle); (ii) transmit the user request to an insurer auction network, where the insurer auction network includes a plurality of insurers; (iii) receive, from the insurer auction network, a plurality of bids from a plurality of insurers for insurance for the trip (or a winning bid); (iv) display the plurality of bids (or winning bid) to the user; (v) receive a user selection of a bid of the plurality of bids (or approval of the winning bid); (vi) transmit the user selection (or user approval) to the insurer auction network; (vii) generate an insurance contract (such as a virtual or electronic insurance and/or smart contract) based upon the user request and the selected bid (or user approval of the winning bid); (viii) receive the insurance contract from an insurance server associated with the selected bid (or winning bid); (ix) store the insurance contract based upon the selected bid (or winning bid), where the insurance contract is in a blockchain structure, where a plurality of nodes store copies of the insurance contract in the blockchain structure. The plurality of nodes may include a plurality of computer devices each associated with one of a plurality of vehicles, and the insurance server may be one of the plurality of nodes, and may include one or more terms (the terms may include conditions, obligations, duties, limitations (including driver or vehicle limitations associated with a specific trip or usage-based insurance contract), premiums, discounts, deductibles, clauses, and/or other terms); (x) receive, from the driver and/or vehicle, a requested modification of at least one of the one or more terms of the insurance contract; (xi) transmit the requested modification to an insurance server associated with the insurance contract; (xii) receive a response to the request from the insurance server, where the response includes one or more additional terms; (xiii) display the one or more additional terms to the driver for approval; (xiv) receive approval of the one or more additional terms from the driver or vehicle; (xv) store the one or more additional terms and the response in the insurance contract; (xvi) generate a new block for the insurance contract based upon the requested modification and the response; (xvii) update the insurance contract with the new block; (xviii) transmit the new block the plurality of nodes, where each the plurality of nodes are configured to update their stored copies of the insurance contract with the new block; (xix) transmit the requested modification and the response to the plurality of nodes, where each of the plurality of nodes are configured to generate a new block based upon the requested modification and the response and update their stored copies of the insurance contract with the generated block; (xx) receive sensor information from one or more sensors associated with the vehicle or user mobile device; and/or (xxi) with the driver's or vehicle owner's permission or affirmative consent, compare the received sensor information with the one or more terms of the insurance contract.

The system may (xxii) determine whether the driver and/or vehicle (such as autonomous vehicle) complied with the one or more terms based upon the comparison; (xxiii) if the determination is that the driver and/or vehicle complied with the one or more terms, the computer device is further configured to: (a) transmit a notification of driver compliance to an insurance server associated with the insurance contract; (b) generate a new block for the insurance contract based upon the notification of driver compliance; (c) store the notification of driver compliance in the (electronic or smart) insurance contract; (d) receive an indication of a discount and/or lower premium for the insurance contract from the insurance server; (e) generate a new block for the insurance contract based upon the indication of the discount and/or lower premium; (f) store the indication in the insurance contract (g) display the indication of the discount and/or lower premium for the insurance contract to the driver including an acknowledgement request; (h) receive the acknowledgement from the driver; (i) generate a new block for the insurance contract based upon the acknowledgement; (j) store the acknowledgement in the insurance contract; and/or (k) generate a new block for the insurance contract based upon the notification, the indication, and the acknowledgement; and/or (xxiv) generate a new block for the insurance contract that includes sensor information on a periodic basis.

The system may additionally or alternatively: (xxii) determine whether the driver and/or vehicle (such as autonomous vehicle) is approaching within a predetermined threshold of violating one or more terms based upon the comparison; (xxiii) if the determination is that the vehicle operation by the driver and/or vehicle itself (e.g., an autonomous vehicle) is approaching the one or more terms (or limits of vehicle operation), the computer device is further configured to: (a) transmit a warning or notification to the driver and/or vehicle; (b) generate a new block for the insurance contract based upon the notification; (c) store the notification in the (electronic or smart) insurance contract. The computing device may include additional, less, or alternate functionality, including that discussed elsewhere herein.

At least one advantage of this system is that because the system receives the actual telematics information from the vehicle during the trip, the computer device may analyze, with the driver's permission or affirmative consent (such as by opt-in to an insurance rewards program), the data to accurately determine if the driver has complied with the terms of the insurance during the trip and to be able to report that compliance to the insurer associated with the applicable insurance contract. Furthermore, since the insurance contract is stored using a blockchain format both the insurer and the computer device associated with the vehicle are able to update the insurance contract to ensure its accuracy. Another advantage of the system is allowing a driver a quick and efficient method of determining the most advantageous trip insurance. A further advantage of the system is to allow the driver and/or vehicle to request modifications of the insurance contract as the trip is occurring. This improves the level of customer service given to the driver by allowing reasonable modifications automatically.

In one aspect, a computer system for managing usage-based insurance is provided. The computer system may include at least one processor (and/or associated transceiver) in communication with at least one memory device. The at least one processor (and/or associated transceiver) may be configured or programmed to: (1) store an insurance contract for a currently occurring (or an approaching, upcoming, or impending) trip, where the insurance contract is for a driver of a vehicle to insure the driver and/or vehicle during the currently occurring (or the approaching, upcoming, or impending) trip, and where the insurance contract includes one or more terms (such as conditions, clauses, vehicle or driver limitations, etc.); (2) receive, from the driver or vehicle controller, a requested modification of at least one of the one or more terms of the insurance contract; (3) transmit the requested modification to an insurance server associated with the insurance contract; (4) receive a response to the request from the insurance server; and (5) store the response in the insurance contract to facilitate quickly and accurately processing changes to an insurance contract. The computer system may have additional, less, or alternate functionality, including that discussed elsewhere herein.

In another aspect, a computer system for managing usage-based insurance is provided. The computer system may include at least one processor (and/or associated transceiver) in communication with at least one memory device. The at least one processor (and/or associated transceiver) may be configured or programmed to: (1) store a virtual or electronic smart insurance contract for a currently occurring (or an approaching, upcoming, or impending) trip, where the insurance contract is for a driver of a vehicle to insure the driver and/or vehicle during the currently occurring (or the approaching, upcoming, or impending) trip, and where the insurance contract includes one or more terms, conditions, limitations, etc.; (2) with the driver's or vehicle owner's permission or affirmative consent, receive sensor information from one or more sensors associated with the vehicle (which may a smart and/or autonomous vehicle); (3) compare the received sensor information with the one or more terms of the insurance contract; (4) determine whether the driver and/or autonomous vehicle complied with the one or more terms based upon the comparison; and (5) if the determination is that the driver and/or autonomous vehicle complied with the one or more terms, the processor (and/or associated transceiver) is further programmed to: (a) transmit a notification of driver and/or autonomous vehicle compliance to an insurance server associated with the insurance contract; and (b) store the notification of driver and/or autonomous vehicle compliance in the insurance contract to facilitate accurately monitoring a driver's or autonomous vehicle's behavior and actions in regards to the insurance contract. The computer system may have additional, less, or alternate functionality, including that discussed elsewhere herein.

In yet another aspect, a computer system for managing usage-based insurance is provided. The computer system may include at least one processor (and/or associated transceiver) in communication with at least one memory device. The at least one processor (and/or associated transceiver) may be configured or programmed to: (1) receive a user request for trip insurance, where the user request includes a plurality of information about the user, the vehicle (which may be an autonomous vehicle), and the trip; (2) transmit the user request to an insurer auction network, wherein the insurer auction network includes a plurality of insurers; (3) receive, from the insurer auction network, a plurality of bids from a plurality of insurers for insurance for the trip; (4) display the plurality of bids to the user; (5) receive a user selection of a bid of the plurality of bids; (6) transmit the user selection to the insurer auction network; and (7) update a blockchain using the user selection and/or store an insurance contract, such as a smart contract in a blockchain structure, based upon the selected bid to facilitate allowing a user to have a plurality of choices for a trip insurance contract. The computer system may have additional, less, or alternate functionality, including that discussed elsewhere herein.

Instill another aspect, a computer system for managing usage-based insurance is provided. The computer system may include at least one processor (and/or associated transceiver) in communication with at least one memory device. The at least one processor (and/or associated transceiver) may be configured or programmed to: (1) store a plurality of insurance contracts, where each insurance contract is in a blockchain structure, and where each of the plurality of insurance contracts are also stored on a plurality of nodes; (2) receive an update to one of the plurality of insurance contracts; (3) generate a new block including the update for the insurance contract associated with the update to be added to the block chain structure; and (4) transmit the new block to each of the plurality of nodes that are storing the associated insurance contract, so that each receiving node will update the associated insurance contract to facilitate efficient and accurate record keeping of the insurance contracts. The computer system may have additional, less, or alternate functionality, including that discussed elsewhere herein.

Ina further aspect, a computer system for generating and managing usage-based contracts using blockchains is provided. The computer system may include at least one processor in communication with at least one memory device. The at least one processor may be programmed to: (1) store a smart (or other electronic or virtual) insurance contract for a currently occurring or impending trip, wherein the smart insurance contract is for a driver or passenger of a vehicle, or the vehicle itself, to insure the driver, passenger, and/or vehicle (which may be smart or autonomous vehicle) during the currently occurring or impending trip, wherein the insurance contract includes one or more terms, conditions, obligations, duties, limitations (such as driver limitations, vehicle operation limitations (e.g., limited time-of-day operation, limited number of miles, limited to good weather or road conditions), and/or autonomous vehicle operation limitations), premiums, discounts, and/or other clauses, wherein the insurance contract is in a blockchain structure, and wherein a plurality of nodes store copies of the insurance contract in the blockchain structure; (2) receive, from the driver, passenger, and/or vehicle, a requested modification of at least one of the one or more terms, conditions, limitations, clauses, etc. of the smart insurance contract (such as via wireless communication or data transmission over one or more radio links or digital communication channels); (3) transmit the requested modification to an insurance server associated with the insurance contract (such as via wireless communication or data transmission over one or more radio links or digital communication channels), the insurance server may be associated with an insurance auction network configured to receive and select winning bids for usage-based insurance and/or trip insurance; (4) receive a response to the request from the insurance server (such as via wireless communication or data transmission over one or more radio links or digital communication channels), which may include a winning bid for the trip insurance determined by the insurance auction network; and/or (5) store the response in a new block in the smart insurance contract to facilitate providing trip insurance for drivers, passengers, and/or autonomous or other vehicles in a transparent manner.

Moreover, in at least one aspect a computer system for managing usage-based insurance is provided. The computer system may include at least one processor in communication with at least one memory device. The at least one processor may be programmed to: (1) store a smart insurance contract for a currently occurring or impending trip, wherein the insurance contract is to insure a driver, passenger, and/or vehicle during the currently occurring or impending trip, and wherein the insurance contract includes one or more terms, conditions, limitations (such as driver or vehicle limitations during the trip), duties, obligations, premiums, deductibles, discounts, etc.; (2) receive sensor information from one or more sensors associated with the vehicle; (3) compare the received sensor information with the one or more terms, conditions, etc. of the insurance contract; (4) determine whether the driver and/or vehicle (such as an autonomous vehicle) complied with the one or more terms, conditions, etc. based upon the comparison; and (5) if the determination is that the driver and/or vehicle complied with the one or more terms, conditions, etc. the processor is further programmed to: (a) transmit a notification of driver and/or vehicle compliance to an insurance server associated with the smart insurance contract; and/or (b) store the notification of driver and/or vehicle compliance in the smart insurance contract to facilitate timely providing trip insurance to drivers and/or vehicles.

In addition, computer-implemented method for generating and managing usage-based contracts using blockchains is provided. The method may be implemented on an insurance monitoring ("IM") computer system including at least one processor in communication with at least one memory device. The method may include: (1) storing, in the memory device, a smart insurance contract for a currently occurring or impending (or upcoming or approaching) trip, wherein the insurance contract is for a driver of a vehicle, or the vehicle itself if programmed to, to insure the driver, passengers, and/or the vehicle during the currently occurring or impending trip, and wherein the smart insurance contract includes one or more terms, conditions, limitations, deductibles, premiums, discounts, etc.; (2) receiving, at the IM computer system, sensor information from one or more sensors associated with the vehicle; (3) comparing, by the IM computer system, the received sensor information with the one or more terms, conditions, limitations, etc. of the insurance contract; (4) determining, by the IM computer system, whether the driver and/or vehicle (such as a self-driving vehicle) complied with the one or more terms, conditions, limitations, etc. based upon the comparison; and (5) if the determination is that the driver and/or vehicle complied with the one or more terms, conditions, limitations, etc., the method further comprises: (a) transmitting, by the IM computer system, a notification of driver and/or vehicle compliance to an insurance server associated with the insurance contract; and (b) storing, in the memory device, the notification of driver and/or vehicle compliance in the smart insurance contract to facilitate timely modification of trip insurance for drivers, passengers, and/or autonomous or other vehicles.

Also in at least one aspect, a computer system for managing usage-based insurance is provided. The computer system may include at least one processor in communication with at least one memory device. The at least one processor may be programmed to: (1) receive a user request for trip insurance, wherein the user request includes a plurality of information about the user, passengers, the vehicle (such as autonomous vehicle technology and features), and/or the trip (miles, time-of-day, weather, road or construction conditions, etc.); (2) transmit (such as via wireless communication or data transmission over one or more radio links or digital communication channels) the user request to an insurer auction network, wherein the insurer auction network includes a plurality of insurers; (3) receive (such as via wireless communication or data transmission over one or more radio links or digital communication channels), from the insurer auction network, a plurality of bids from a plurality of insurers for insurance for the trip (or a winning bid selected by the insurer auction network); (4) display the plurality of bids (or winning bid) to the user; (5) receive a user selection of a bid of the plurality of bids (or acceptance of the winning bid); (6) transmit the user selection to the insurer auction network; and (7) store a smart insurance contract based upon the selected bid to facilitate timely providing trip insurance for a driver, passenger, and/or autonomous or other vehicle selected via an auction network.

In at least one further aspect, a computer system for managing usage-based insurance is provided. The computer system may include at least one processor in communication with at least one memory device. The at least one processor may be programmed to: (1) store a plurality of smart insurance contracts, wherein each smart insurance contract is associated with usage-based insurance for a driver and an individual vehicle, and/or for an autonomous vehicle, and is in a blockchain structure, and wherein each of the plurality of smart insurance contracts are also stored on a plurality of nodes; (2) receive an update to one of the plurality of smart insurance contracts, the update pertaining to trip insurance associated with (or covering) an upcoming, approaching, or impending trip for the driver and vehicle, and/or for the autonomous vehicle; (3) generate a new block including the update for the smart insurance contract associated with the trip insurance and associated with the update to be added to the blockchain structure; and (4) transmit the new block to each of the plurality of nodes that are storing the associated smart insurance contract, so that each receiving node will update the associated smart insurance contract to facilitate timely providing trip insurance for drivers, vehicles, and/or autonomous vehicles.

In one aspect, a computer system for managing usage-based insurance may be provided. The computer system may include at least one processor in communication with at least one memory device. The at least one processor may be programmed to: (1) store an insurance contract for a currently occurring or impending trip, wherein the insurance contract is for a driver of a vehicle to insure the driver during the currently occurring or impending trip, and wherein the insurance contract includes one or more terms; (2) receive telematics data associated with the vehicle; (3) compare the received telematics data with the one or more terms of the insurance contract; (4) determine whether the driver complied with the one or more terms based upon the comparison;

and/or (5) if the determination is that the driver complied with the one or more terms, the processor may be further programmed to: (a) transmit a notification of driver compliance to an insurance server associated with the insurance contract; and (b) store the notification of driver compliance in the insurance contract to facilitate timely modification of trip insurance for drivers, passengers, and/or autonomous or other vehicles. The system may include additional, less, or alternate functionality, including that discussed elsewhere herein.

In another aspect, a computer system for managing usage-based insurance may be provided. The computer system may include at least one processor in communication with at least one memory device. The at least one processor may be programmed to: (1) store a plurality of insurance contracts, wherein each insurance contract is in a blockchain structure, and wherein each of the plurality of insurance contracts are also stored on a plurality of nodes; (2) receive telematics data associated with one of the plurality of insurance contracts; (3) generate a new block including the telematics data for the insurance contract associated with the telematics data to be added to the blockchain structure; and/or (4) transmit the new block to each of the plurality of nodes that are storing the associated insurance contract, so that each receiving node will update the associated insurance contract, so that each receiving node will update the associated smart insurance contract to facilitate timely providing trip insurance for drivers, vehicles, and/or autonomous vehicles. The system may include additional, less, or alternate functionality, including that discussed elsewhere herein.

In another aspect, a computer system for managing usage-based insurance may be provided. The computer system may include at least one processor in communication with at least one memory device. The at least one processor may be programmed to: (1) receive a user request for trip insurance, wherein the user request includes a plurality of information about the user, the vehicle, and the trip including a usage profile of the user; (2) transmit the user request to an insurer auction network, wherein the insurer auction network includes a plurality of insurers; (3) receive, from the insurer auction network, a plurality of bids from a plurality of insurers for insurance for the trip; (4) display the plurality of bids to the user; (5) receive a user selection of a bid of the plurality of bids; (6) transmit the user selection to the insurer auction network; and/or (7) store an insurance contract based upon the selected bid to facilitate timely providing trip insurance for a driver, passenger, and/or autonomous or other vehicle selected via an auction network. The system may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
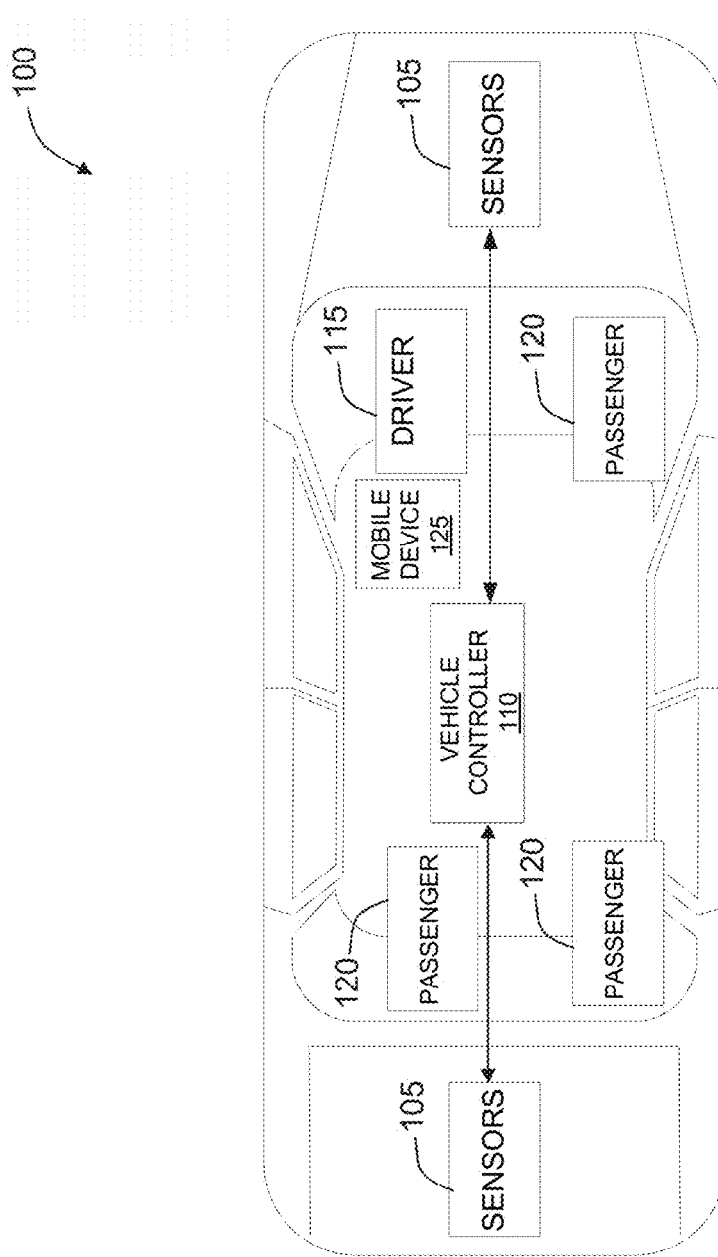
FIG. 1 illustrates a schematic diagram of an exemplary autonomous or other vehicle.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for managing Usage-Based Insurance (UBI) contracts using blockchains. In one exemplary embodiment, the process may be performed by a computer device associated with a vehicle (such as an autonomous or smart vehicle controller or a user mobile device) and a User Based Auto Insurance Management ("UBAIM") system, also known as a User Based Auto Insurance Management ("UBAIM") server.

A blockchain is a distributed database that maintains a continuously-growing list of ordered records, known as blocks. Each block may contain at least a timestamp and a link to the previous block in the chain. The link to the previous block may be a hash of the previous block. For an insurance contract, the first block may contain the initial contract between a driver and an insurer. The second block may contain a modification to the contract that was requested by the driver and approved by the insurer. The second block may contain a hashed copy of the first block as well. The third block may contain one or more additional terms for the insurance contract and a hashed copy of the second block. This continues on with each block adding on to the next while containing a hash of the previous blocks in the blockchain.

To ensure the security of the information contained in the blockchain, copies of the blockchain may be distributed across multiple computer devices, known as nodes. These nodes maintain the blockchain, update the blockchain when changes occur, and ensure the stability of the blockchain itself. In some embodiments, nodes may be also used to calculate the hash of the previous blocks. As the blockchain grows, the processing power needed to calculate the hash of the previous blocks grows as well. In these embodiments, the processing of the hash may be distributed over multiple computer devices to improve the speed of processing and/or to not overburden the hashing processor. When a node processes (hashes) a block, that node is known as a miner, where the action of validating and hashing the block is also known as mining.

In the exemplary embodiment, a driver 115 is preparing to drive a vehicle on a trip. The driver generates a trip request. In some embodiments, the driver generates the trip request through a mobile device, such as a smartphone. In other embodiments, the trip request is generated through a vehicle controller of the vehicle to be driven, or operated (such as an autonomous vehicle) on the trip. To complete the trip request, the driver may enter additional information about the trip, such as, but not limited to, driver information, vehicle information, origin point, destination, date and time information, user preferences, autonomous vehicle settings, and/or other necessary data relating to the trip. For example, a trip may be for a few hours, where the driver is planning on driving to several local locations, such as for a shopping trip. Another trip may be for a few days, where the driver plans to drive from Washington D.C. to Chicago and back over a period of several days, such as for a vacation.

In the exemplary embodiment, the trip information may be transmitted to a multi-carrier auto insurer auction network, such as via wireless communication or data transmission over one or more radio links or digital communication channels. Within the insurer auction network may be a plurality of insurers, where computer devices associated with each insurer are in communication with the insurer auction network. In the exemplary embodiment, each insurer may receive the trip information from the driver or vehicle, and generates a bid for insuring driver's trip. The bids may be transmitted to the driver or the vehicle, such as through the vehicle controller. Each bid may include information about the bid, such as, but not limited to, limitations on the routes that the driver may take, price, such as price per mile (and/or the usage-based or mission-based insurance premium or rate), and/or stipulations or restrictions. These stipulations and/or restrictions may be based upon driver behavior, such as, but not limited to, maximum speed, maximum travel time per day, minimum safe following distance, autonomous or semi-autonomous vehicle settings, and/or other driving behaviors that the insurer wishes to control.

In the exemplary embodiment, the driver may choose a bid to accept. The selection is communicated to the winning insurer. The winning insurer communicates information about the policy, the driver, and the vehicle to its UBAIM system. When the driver accepts a policy, a smart contract (which may be an electronic or virtual contract) may be generated. As will be explained further below, a smart contract may be based upon a blockchain structure. In the exemplary embodiment, the smart contract includes all of the information about the trip insurance policy including the information on the stipulations. In the exemplary embodiment, the smart contract may be stored in plurality of locations including the vehicle controller and the UBAIM system. In the exemplary embodiment, the smart contract is a blockchain ledger that is distributed among a plurality of participants (also known as nodes). The nodes are capable of communicating with the UBAIM system though an application programming interface (API). The UBAIM system may also use the API to communicate with outside applications, such as, but not limited to, data sources about the vehicle and/or the driver, access to law enforcement, and other applications as necessary to work as described herein. In the exemplary embodiment, the UBAIM system may include a firewall to protect the private information of the driver. In some further embodiments, the private information is only stored by the UBAIM system and is not stored in the blockchain ledger.

In the exemplary embodiment, the UBAIM system may also include a usage manager/messaging system. The UBAIM system may use usage manager/messaging system 230 to communicate with the driver or the vehicle controller. The UBAIM system may receive information about an ongoing trip, such as driver behavior to determine if the driver is within the restrictions required by the policy. The UBAIM system may also receive communications from the driver requesting a variance from the restrictions of the trip insurance. For example, the driver may decide to travel 30 miles off of the route described in the policy, such as to visit a friend or a specific scenic site. The driver may transmit a request to the UBAIM system requesting this variance. The UBAIM system may determine whether or not to allow this variance. If the UBAIM system approves the variance, then the smart contract is updated. In some embodiments, this update may be performed at the prime node (such as at the UBAIM server) and a new block is transmitted to the other nodes in the blockchain ledger. In other embodiments, information about the update may be transmitted to the other nodes in the blockchain ledger for them to create their own blocks.

In the exemplary embodiment, each smart contract is stored in its own blockchain ledger. As the smart contract is modified or additional information is added to the smart contract, such as actual driver behavior, another block may be added to the blockchain of the smart contract.

At least one of the technical problems addressed by this system may include: (i) improving speed and accuracy of issuing an insurance policy (usage-based policy) for an individual trip; (ii) allowing for automatic changes to the insurance policy based upon a user request; (iii) improving the online security of the insurance policy through the blockchain technology; (iv) accurately monitoring the actions of the insured and/or an autonomous vehicle to ensure compliance with the insurance policy; (v) constantly improving the accuracy of data used to make insurance decisions about trip insurance; and/or (iv) facilitating an auction environment for individual trip insurance.

The methods and systems described herein may be implemented using computer programming or engineering techniques including computer software, firmware, hardware, or any combination or subset thereof, wherein the technical effects may be achieved by performing at least one of the following steps: (a) store an insurance contract for a currently occurring trip or an upcoming trip, where the insurance contract is for a driver of a vehicle to insure the driver and/or vehicle during the currently occurring or upcoming trip, and where the insurance contract includes one or more terms; (b) receive sensor information from one or more sensors associated with the vehicle; (c) compare the received sensor information with the one or more terms of the insurance contract; (d) determine whether the driver and/or autonomous vehicle complied with the one or more terms based upon the comparison; and (f) if the determination is that the driver and/or autonomous vehicle complied with the one or more terms, the processor may be further programmed to: (1) transmit a notification of driver and/or autonomous vehicle compliance to an insurance server associated with the insurance contract; and (2) store the notification of driver and/or autonomous vehicle compliance in the insurance contract.

Additional technical effects may be achieved by performing at least one of the following steps: (a) receive, from the driver and/or an autonomous or smart vehicle, a requested modification of at least one of the one or more terms of the insurance contract; (b) transmit the requested modification to an insurance server associated with the insurance contract; (c) receive a response to the request from the insurance server; and (d) store the response in the insurance contract. For example, as a new block associated with the blockchain structure.

Further technical effects may be achieved by performing at least one of the following steps: (a) receive a user request for trip insurance (such as via wireless communication or data transmission over one or more radio links or digital communication channels), where the user request includes a plurality of information about the user, the vehicle (which may be a smart or autonomous vehicle), and the trip; (b) transmit the user request to an insurer auction network, where the insurer auction network includes a plurality of insurers; (c) receive, from the insurer auction network, a plurality of bids from a plurality of insurers for insurance for the trip; (d) display the plurality of bids to the user; (e) receive a user selection of a bid of the plurality of bids; (f) transmit the user selection to the insurer auction network; and (g) store an insurance contract based upon the selected bid, such as in a blockchain structure.

Moreover, additional technical effects may be achieved by performing at least one of the following steps: (a) store a plurality of insurance contracts, where each insurance contract is in a blockchain structure, and where each of the plurality of insurance contracts are also stored on a plurality of nodes; (b) receive an update to one of the plurality of insurance contracts; (c) generate a new block including the update for the insurance contract associated with the update to be added to the block chain structure; and/or (d) transmit the new block to each of the plurality of nodes that are storing the associated insurance contract, so that each receiving node will update the associated insurance contract.

Exemplary Vehicle

FIG. 1 depicts a view of an exemplary vehicle 100. In some embodiments, vehicle 100 may be an autonomous or semi-autonomous vehicle capable of fulfilling the transportation capabilities of a traditional automobile or other vehicle. In these embodiments, vehicle 100 may be capable of sensing its environment and navigating without human input. In other embodiments, vehicle 100 may be a manual vehicle, such as a traditional automobile that is controlled by a human driver 115.

Vehicle 100 may include a plurality of sensors 105 and a vehicle controller 110. The plurality of sensors 105 may detect the current surroundings and location of vehicle 100. Plurality of sensors 105 may include, but are not limited to, radar, LIDAR, Global Positioning System (GPS), video devices, imaging devices, cameras, audio recorders, and computer vision. Plurality of sensors 105 may also include sensors that detect conditions of vehicle 100, such as speed, acceleration, gear, braking, cornering, and other conditions related to the operation of vehicle 100, for example: at least one of a measurement of at least one of speed, direction rate of acceleration, rate of deceleration, location, position, orientation, and rotation of the vehicle, and a measurement of one or more changes to at least one of speed, direction rate of acceleration, rate of deceleration, location, position, orientation, and rotation of the vehicle. Furthermore, plurality of sensors 105 may include impact sensors that detect impacts to vehicle 100, including force and direction and sensors that detect actions of vehicle 100, such the deployment of airbags.

In some embodiments, plurality of sensors 105 may detect the presence of driver 115 and one or more passengers 120 in vehicle 100. In these embodiments, plurality of sensors 105 may detect the presence of fastened seatbelts, the weight in each seat in vehicle 100, heat signatures, or any other method of detecting information about driver 115 and passengers 120 in vehicle 100.

In certain embodiments, plurality of sensors 105 may include occupant position sensors to determine a location and/or position of each occupant (i.e., driver 115 and, in some embodiments, passengers 120) in vehicle 100. The location of an occupant may identify a particular seat or other location within vehicle 100 where the occupant is located. The position of the occupant may include the occupant's body orientation, the location of specific limbs, and/or other positional information. In one example, plurality of sensors 105 may include an in-cabin facing camera, LIDAR, radar, weight sensors, accelerometer, gyroscope, compass and/or other types of sensors to identify the location and/or position of occupants within vehicle 100.

In the exemplary embodiment, vehicle controller 110 may be configured to communicate with driver 115. In some embodiments, vehicle controller 110 may include a display screen or touchscreen (not shown) that is capable of displaying information to and receiving information from driver 115. In other embodiments, vehicle controller 110 may be capable of wirelessly communicating with a mobile device 125 in vehicle 100. In these embodiments, vehicle controller 110 may be capable of communicating with the user of mobile device 125, such as driver 115, through an application on mobile device 125.

In some embodiments, vehicle 100 may include autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. In these embodiments, the autonomous or semi-autonomous vehicle-related functionality or technology may be controlled, operated, and/or in communication with vehicle controller 110.

The wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or backup systems; navigation or GPS-related systems; security and/or anti-hacking measures; and/or theft prevention systems.

Moreover, where vehicle 100 is an autonomous or semi-autonomous vehicle, vehicle controller 110 may interpret sensory information from sensors 105 to determine usage of vehicle 100 by one or more users (e.g., driver 115 and/or passengers 120) for each trip undertaken by vehicle 100. As used herein, "trip" refers to a discrete use of vehicle 100, from an initial starting point (e.g., starting vehicle 100) to an end point (e.g., reaching a destination or turning off vehicle 100). Determining usage of vehicle 100 by one or more users may facilitate collecting and/or generating vehicle-based telematics data associated with each user.

In addition, vehicle controller 110 may interpret the sensory information to identify vehicle users (e.g., driver 115 and/or passengers 120) present in vehicle 100 during a trip. For example, vehicle computer device 110 may determine positional information for at least one vehicle user of vehicle 100 present in vehicle 100 during a trip. Positional information may include a position of a vehicle user, a direction of facing of the vehicle user, a size of the vehicle user, and/or a skeletal positioning of the vehicle user. The position of the vehicle user may include which seat the vehicle user occupies. The direction of facing of the vehicle user may include whether the vehicle user is facing forward, reaching forward, reaching to the side, and/or has his/her head turned. The size of the vehicle user may determine whether the vehicle user is an adult or a child. The size of the vehicle user may also include the vehicle user's height. The skeletal positioning may include positioning of the vehicle user's joints, spine, arms, legs, torso, neck face, head, major bones, hands, and/or feet.

Where vehicle 100 is a semi-autonomous or regular vehicle, such that a driver 115 controls vehicle 100 during part or the entirety of one or more trips, vehicle controller 110 may interpret sensory information to collect and/or generate telematics data associated with driving characteristics of driver 115. For example, vehicle controller 110 may collect vehicle telematics data from user computer device 125 and/or one or more of sensors 105. Vehicle telematics data may include data from user computer device 125 and/or one or more of sensors 105 and may include navigation, communications, safety, security, and/or "infotainment" data. For example, vehicle telematics data collected and analyzed by vehicle controller 110 may include, but is not limited to braking and/or acceleration data, navigation data, vehicle settings (e.g., seat position, mirror position, temperature or air control settings, etc.), remote-unlock and/or remote-start data (e.g., determining which user computer device 125 is used to unlock or start vehicle 100) and/or any other telematics data.

In one embodiment, vehicle 100 may include a communication device that allows it to communicate with other devices, for example, via the Internet or any other wired or wireless connection (e.g., Bluetooth®) over one or more radio links or wireless communication channels. Vehicle 100 may be in communication with one or more user computer devices 125 that are each associated with one of users of vehicle 100. In some embodiments, vehicle 100 may have "application pairing" functionality via the communication device, such that vehicle users may engage with an app on a user interface at the vehicle and/or on their user computer device 125 (e.g., their smartphone). In one embodiment, at the beginning and/or at the end of a trip, the app may prompt selection of which vehicle user is/was the driver 115 of the trip, and vehicle controller 110 may record the selected driver 115 as the driver 115 for the trip, such that telematics data associated with that trip may be attributed to the correct driver 115. Additionally or alternatively, this method may be employed as a validation or verification to one or more other determination methods. For example, after a trip in which the driver 115 is determined using another method, the app may prompt confirmation that the determined driver 115 was, in fact, the driver 115 of the trip. Vehicle controller 110 may receive an indication of a positive or negative response to the prompt, and update records for the trip accordingly.

Using the application pairing functionality, vehicle controller 110 may further determine which user computer device(s) 125 are within vehicle 100 during a trip. For example, each user may pair one or more user computer devices 125 (e.g., smartphones, tablets, laptops, wearables, etc.) to vehicle 100. Vehicle 100 may then pair with one or more user computer devices 125 that are within vehicle 100 during a trip. Vehicle controller 110 may record which device(s) 725 pair with vehicle 100 for a trip. If only one user computer device 125 pairs with vehicle 100, vehicle controller 110 may determine that the user associated with that user computer device 125 was the driver 115 for the trip. If more than one user computer device 125 pairs with vehicle 100, vehicle controller 110 may request selection and/or confirmation of which associated vehicle user is the driver 115 for the trip, as described above (e.g., using an in-vehicle app and/or an app on the user computer device 125).

In still other embodiments, vehicle controller 110 may use additional and/or alternative vehicle telematics data, such as sensor information from sensors within a paired user computer device 125, to determine which vehicle user is the driver 115 when multiple user computer devices 125 pair with vehicle 100 during a single trip. In one example, vehicle controller 110 may use gyroscope and/or accelerometer sensor information from the paired user computer devices 125 to identify which side of vehicle 100 each user of a user computer device 125 used to enter vehicle 100 and/or exit vehicle 100. In other words, vehicle controller 110 may access and process data from the gyroscope and/or accelerometer for each user computer device 125 to determine whether the user of the user computer device 125 entered vehicle 100 on the left (e.g., driver) or the right (e.g., passenger). If only two user computer devices 125 are present and vehicle controller 110 determines that a first device 125 is associated with the left side of vehicle 100 and a second device 125 is associated with the right side of vehicle 100, vehicle controller 110 may record that the user associated with the first device 125 is the driver 115 and the user of the second device 125 is a passenger 120 for the trip. If more than one device 125 is associated with the left side of vehicle 100 (e.g., the driver's side), vehicle controller 110 may employ one or more other methods described herein to determine the driver 115 of vehicle 100. It should be understood that although the left side is associated with a "driver's side" and the right side is associated with a "passenger side" herein, as is the custom in the United States of America, this method is easily applied to other driving customs in which the left side is a passenger side and the right side is the driver's side.

Another method of determining the driver 115 of a trip may include providing user-specific keys. For instance, each user of vehicle 100 may receive a user-specific key fob (or other device, such as a mobile device, i.e., smartphone or wearable electronics), which is registered to that specific user. The users may sign a contract or other agreement that each user will only use the key specific to his- or herself, which may encourage the vehicle users to carefully and consistently only use their specific key. When the user-specific key is employed to unlock and/or start vehicle 100 (e.g., in keyless start vehicles), vehicle controller 110 may record which key is used, and, therefore, may identify which vehicle user to designate as the driver 115 for the trip. Additionally or alternatively, location-sensitive tracking may be used to determine which user-specific key is within vehicle 100 during the trip. If only one user-specific key is sensed, vehicle controller 110 may record which user-specific key was sensed, may automatically designate the associated vehicle user as the driver 115.

Moreover, vehicle controller 110 may use driving profiles developed as described herein to identify drivers 115 of one or more trips in vehicle 100. For example, driving 15 miles in the morning at average speeds of 50 mph and with few sudden decelerations may be associated with User A (e.g., a commuting user) for a dozen trips using one or more of the above methods, such that any other trips that share some or all of these characteristics may be automatically associated with User A (e.g., without using any or all of the above methods).

In still other embodiments, vehicle 100 may include and employ one or more biometric sensors 105 to determine which vehicle user is the driver 115 for a trip. Biometric sensors 105 may include any sensor 105 configured to receive a biological signal uniquely identifying an individual, such as, but not limited to, retinal scanners, fingerprint scanners, facial recognition devices, and weight scales. In one example, vehicle 100 may have one or more fingerprint scanners on a component of vehicle 100 only easily accessible by the driver, such as the dashboard, the console, or the steering wheel. In another example, vehicle 100 may have a weight scale (or pressure sensor) associated with the driver's seat and/or with the passenger's seats. Vehicle 100 may have a registered weight associated with each user of vehicle 100. When any vehicle user sits in any of the seats, their weight may be measured by the scale and the particular vehicle user may be identified.

While vehicle 100 may be an automobile in the exemplary embodiment, in other embodiments, vehicle 100 may be, but is not limited to, other types of ground craft, aircraft, and watercraft vehicles.

Exemplary Process for Managing Usage-Based Insurance

Figure 2:
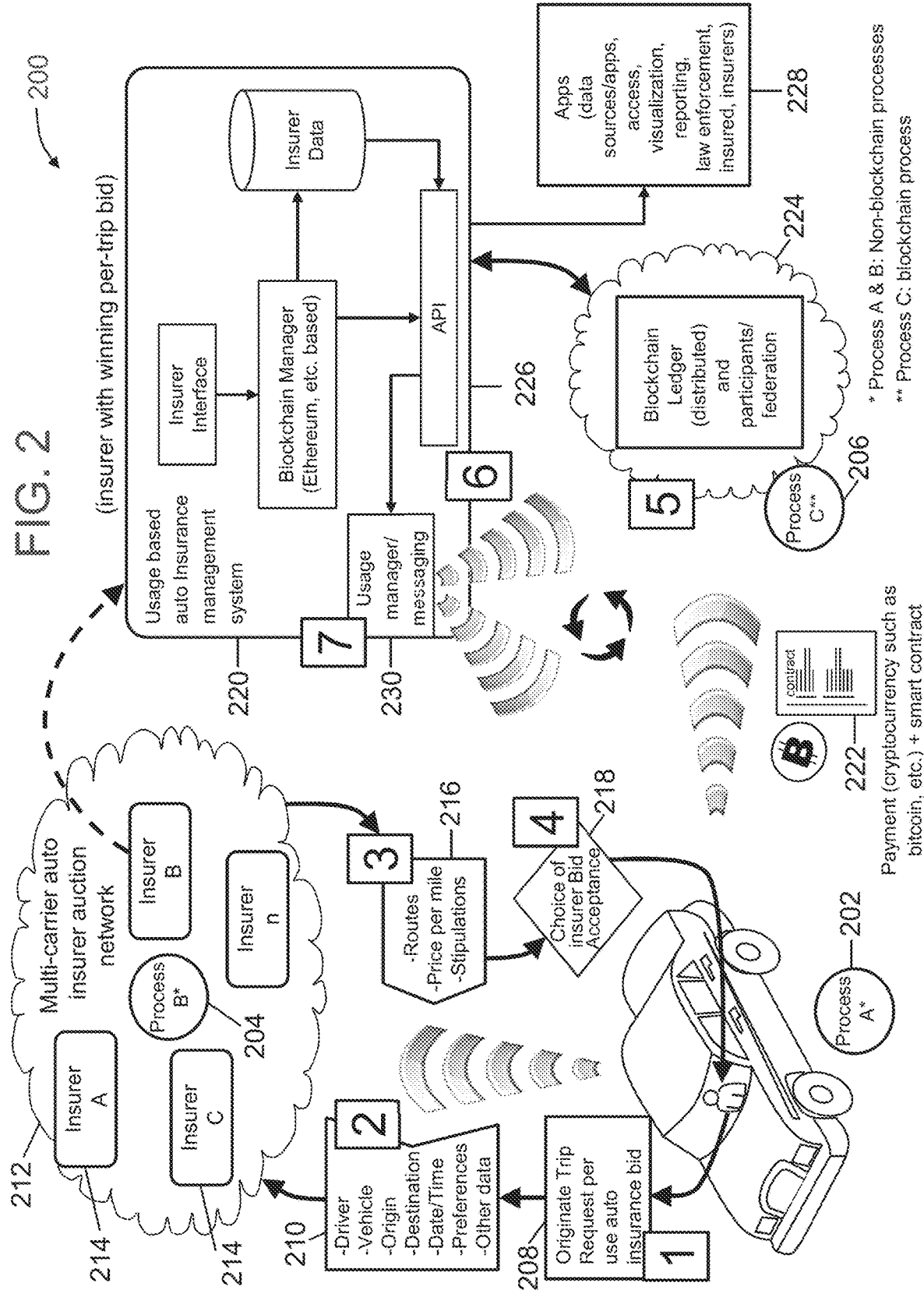
FIG. 2 illustrates a flow chart of an exemplary computer-implemented process of managing usage-based insurance, such as of the vehicle shown in FIG. 1.

FIG. 2 illustrates a flow chart of an exemplary computer-implemented process 200 of managing usage-based insurance, such as of vehicle 100 shown in FIG. 1. Process 200 may include three sub-processes. Process A 202 describes a user setting up insurance for an individual trip. Process B 204 describes a multi-carrier auction network for bidding on the individual trip insurance. Process C 206 describes managing the information of the individual trip insurance before, during, and after the trip.

In the exemplary embodiment, a driver 115 (shown in FIG. 1) is preparing to drive vehicle 100 on a trip, or use vehicle 100 to travel during the trip (such as in the case of an autonomous vehicle). The trip request may be generated 208 by driver 115. In some embodiments, driver 115 may generate 208 the trip request through mobile device 125 (shown in FIG. 1). In other embodiments, the trip request is generated 208 through vehicle controller 110 (shown in FIG. 1). To complete the trip request, driver 115 or vehicle controller 110 may enter additional information about the trip 210, such as, but not limited to, driver information, vehicle information, origin point, destination, date and time information, user preferences, and other necessary data relating to the trip. For example, a trip may be for a few hours, where driver 115 is planning on driving to several local locations, such as for a shopping trip. Another trip may be for a few days, where driver 115 plans to drive from Washington D.C. to Chicago and back over a period of several days, such as for a vacation.

In the exemplary embodiment, the trip information may be transmitted to a multi-carrier auto insurer auction network 212, such as via wireless communication or data transmission over one or more radio links or digital communication channels. Within insurer auction network 212 may be a plurality of insurers 214, where a computer device associated with each insurer 214 is in communication with insurer auction network 212. In the exemplary embodiment, each insurer 214 may receive the trip information from driver 115 and/or vehicle controller, and may in turn generate a bid 216 for insuring driver's trip. Bids 216 may be transmitted to driver 115, such as through vehicle controller 110. Each bid 216 may include information about bid 216, such as, but not limited to, limitations on the routes that driver 115 or vehicle may take, price, such as price per mile (and/or the usage-based or mission-based insurance premium or rate), and/or stipulations or restrictions. These stipulations and/or restrictions may be based upon driver and/or vehicle behavior, such as, but not limited to, maximum speed, maximum travel time per day, minimum safe following distance, passive or aggressive driving, and other driving and/or vehicle behaviors that insurer 214 wishes to control.

In the exemplary embodiment, driver 115 chooses a bid 216 to accept 218. The selection may be communicated with the winning insurer 214, such as via wireless communication or data transmission over one or more radio links or digital communication channels. The winning insurer 214 may communicate information about the policy, driver 115, and vehicle 100 to its usage-based auto insurance management (UBAIM) system 220 (also known as UBAIM server). When driver 115 accepts 218 a policy, a smart contract 222 (including usage-based insurance premiums or rates) may be generated.

As will be explained further below, smart contract 222 may be based upon a blockchain structure. In the exemplary embodiment, smart contract 222 may include all of the information about the trip insurance policy including the information on the stipulations. In the exemplary embodiment, smart contract 222 may be stored in plurality of locations including vehicle controller 110 and UBAIM system 220. In the exemplary embodiment, smart contract 222 may be a blockchain ledger 224 that is distributed among a plurality of participants (also known as nodes). The nodes may be capable of communicating with UBAIM system 220 though an application programming interface (API) 226. UBAIM system 220 may also use API 226 to communicate with outside applications 228, such as, but not limited to, data sources about vehicle 100 and/or driver 115, access to law enforcement, and other applications as necessary to work as described herein.

In the exemplary embodiment, UBAIM system 220 may include a firewall (not shown) to protect the private information of driver 115. In some further embodiments, the private information may be only stored by UBAIM system 220 and not stored in blockchain ledger 224.

In the exemplary embodiment, UBAIM system 220 may also include a usage manager/messaging system 230. UBAIM system 220 may use usage manager/messaging system 230 to communicate with driver 115 or vehicle controller 110. UBAIM system 220 may receive information about an ongoing trip, such as driver and/or autonomous vehicle behavior to determine if driver 115 and/or the vehicle is within the restrictions required by the policy. UBAIM system 220 may also receive communications from driver 115 or the vehicle requesting a variance from the restrictions of the trip insurance.

For example, driver 115 may decide to travel 30 miles off of the route described in the policy, such as to visit a friend or a specific scenic site. Driver 115 may transmit a request to UBAIM system 220 requesting this variance. UBAIM system 220 may determine whether or not to allow this variance. If UBAIM system 220 approves the variance, then smart contract 222 may be updated. In some embodiments, this update is performed at the prime node (such as at UBAIM server 220) and a new block is transmitted to the other nodes in blockchain ledger 224. In other embodiments, information about the update is transmitted to the other nodes in blockchain ledger 224 for them to create their own blocks.

In the exemplary embodiment, each smart contract 222 may be stored in its own blockchain ledger 224. As the smart contract 222 is modified or additional information is added to smart contract 222, such as actual driver behavior or autonomous vehicle behavior, another block may be added to the blockchain of smart contract 222.

In some embodiments, the blockchain of smart contract 222 may also include a plurality of telematics data from sensors 105 (shown in FIG. 1) of user's trip. In some of these embodiments, a new block may be added to the blockchain of smart contract 222 on a periodic basis, where the new block contains new telematics data for a period of time. The block may contain some or all of the telematics data collected.

In some embodiments in Process A 202, vehicle controller 110 (shown in FIG. 1) determines whether driver 115 has insurance to drive vehicle 100. In some embodiments, vehicle controller 110 may require driver 115 to log into vehicle 100 and provide insurance information. In other embodiments, vehicle controller 1100 communicates with an application on driver's mobile device 125 (shown in FIG. 1) to determine driver's insurance information. In some embodiments, vehicle controller 110 may also request information about the trip that the user is planning. For example, if driver 115 or the autonomous vehicle is planning to drive to and from a local store, or is the user or vehicle planning to drive to a different city. Based upon the insurance information and the trip information, vehicle controller 110 determines if driver 115 and/or autonomous vehicle has sufficient insurance for the trip. In some embodiments, vehicle controller 110 requests information from a remote insurer computer device about driver 115, the autonomous vehicle, and/or the driver's and the vehicle's insurance information.

Exemplary Computer-Implemented Method for Managing Usage-Based Insurance

Figure 3:
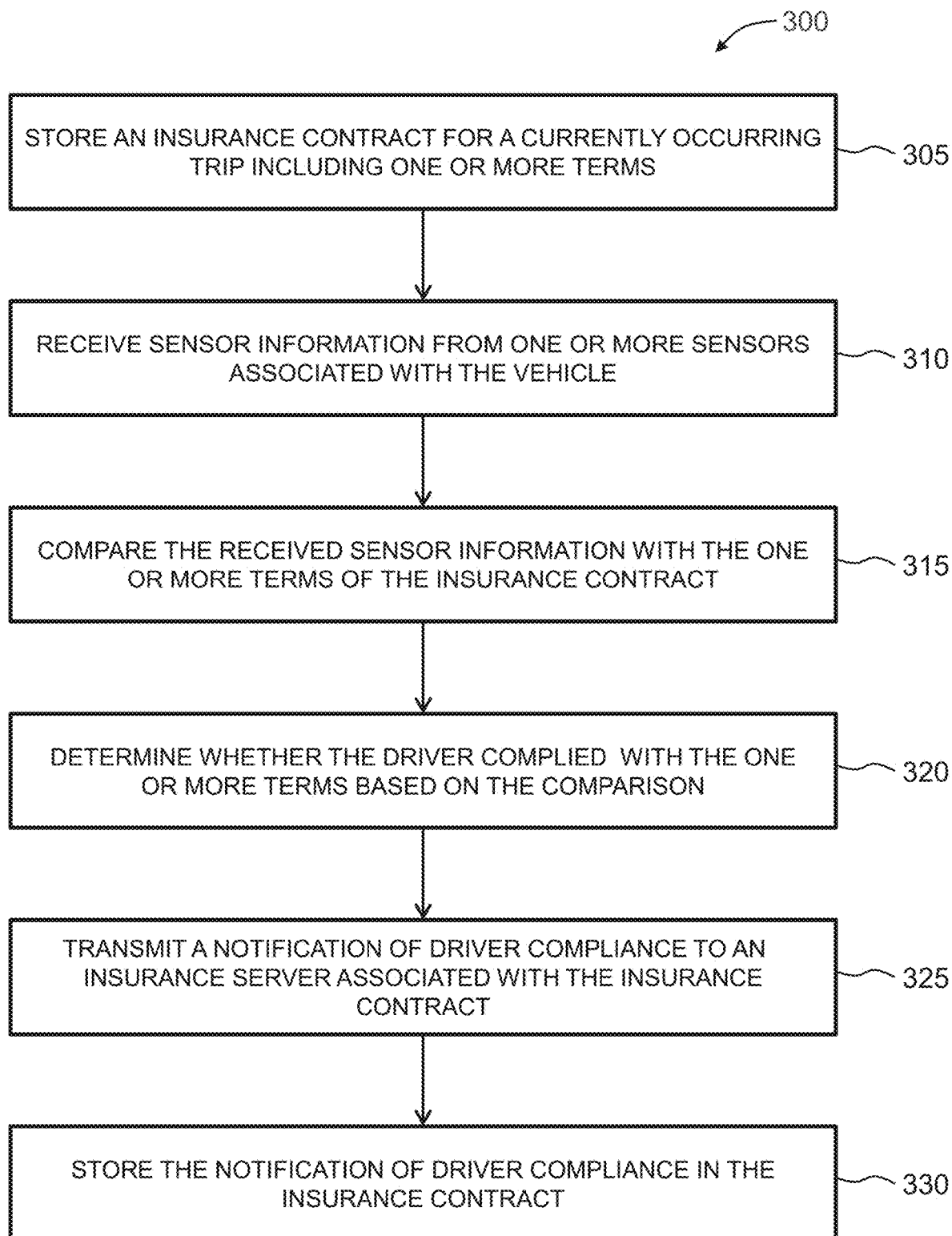
FIG. 3 illustrates a flow chart of an exemplary computer-implemented process for one aspect of managing usage-based insurance as shown in FIG. 2.

FIG. 3 illustrates a flow chart of an exemplary computer implemented process 300 for managing usage-based insurance as shown in FIG. 2. Process 300 may be implemented by a computing device, for example insurance monitoring ("IM") computer device 410 (shown in FIG. 4). In the exemplary embodiment, IM computer device 410 may be in communication with a user computer device 405 (shown in FIG. 4), such as vehicle controller 110 and mobile computer device 125 (both shown in FIG. 1), an insurer auction network 212 (shown in FIG. 2), a User Based Auto Insurance Management ("UBAIM") system 220 (shown in FIG. 2), and a plurality of nodes for the blockchain ledger 224 (shown in FIG. 2).

In the exemplary embodiment, IM computer device 410 may store 305 an insurance contract, such as a virtual or electronic smart contract 222 (shown in FIG. 2), for a currently occurring or impending trip. Insurance contract 222 may be for the driver 115 of vehicle 100 (both shown in FIG. 1) and/or the vehicle 100 to insure the driver 115 and/or the vehicle 100 during the currently occurring or impending trip. Insurance contract 222 may include one or more terms. The one of more terms may define restrictions (and/or terms or endorsements) that the insurance provider 214 (shown in FIG. 2) associated with insurance contract 222 has written into insurance contract 222. Examples of restrictions may include, but are not limited to, maximum speed, maximum travel time per day, minimum safe following distance, time-of-day vehicle operation allowed, mileage allowed for the vehicle to be driven or travel, and other driving behaviors that insurer 214 wishes to control.

In the exemplary embodiment, insurance contract 222 may be stored in a blockchain structure, such as blockchain ledger 224 (shown in Figured 2). Blockchain ledger 224 may include a plurality of nodes store copies of insurance contract 222.

IM computer device 410 may receive 310 sensor information and/or telematics data from one or more sensors 105 (shown in FIG. 1) associated with vehicle 100. For example sensor data may include speed, acceleration, gear, braking, location, and other conditions related to the operation of vehicle 100. With vehicle owner or driver permission, IM computer device 410 may compare 315 the received sensor information and/or telematics data with the one or more terms of insurance contract 222.

Based upon the comparison, IM computer device 410 may determine 320 whether driver 115 and/or vehicle 100 complied with the one or more terms. For example, IM computer device 410 may determine 320 that driver 115 and/or (autonomous) vehicle 100 never deviated from the routes listed in insurance contract 222. In another example, IM computer device 410 may determine 320 that driver 115 and/or vehicle 100 never exceeded the maximum speed as listed in insurance contract 222, and/or did not exceed a specific number of miles the vehicle is insured to be driven or autonomously operated.

If the determination is that driver 115 and/or vehicle 100 complied with the one or more terms, IM computer device 410 may transmits 325 a notification of driver and/or vehicle compliance to an insurance server, such as UBAIM server 220, associated with insurance contract 222, such as via wireless communication or data transmission over one or more radio links or digital communication channels. IM computer device 410 may store the notification of driver compliance in insurance contract 222. In the exemplary embodiment, IM computer device 410 may generate a new block for insurance contract 222 based upon the notification of driver compliance.

In some embodiments, IM computer device 410 may generate and store new blocks for insurance contract 222 that contain sensor information on a periodic basis. In these embodiments, IM computer device 410 may store some or all of the received sensor data in insurance contract 222 for later review.

In some embodiments, UBAIM server 220 may be configured to generate a lower premium and/or a discount for the driver and/or vehicle associated with insurance contract 222 based upon driver's and/or (autonomous) vehicle's compliance with the terms of contract 222. As an incentive for complying with the terms of contract 222, such as staying on the predetermined route, not exceeding the speed limit or an insured number of miles, and other terms and/or restrictions that may be monitored by sensors 105 in vehicle 100, the insurance provider may provide a lower premium on the currently active insurance contract 222 or insurance provider may provide a discount on a future insurance contract. Furthermore, UBAIM server 220 may store information about the driver's or vehicle's compliance and use that information when pricing and/or bidding on future UBI policies with that driver 115 and/or vehicle 100.

If UBAIM server 220 determines to generate a lower premium and/or a discount, UBAIM server 220 may transmit an indication of the lower premium and/or discount for the insurance policy to IM computer device 410, via messaging system 230 (shown in FIG. 2). IM computer device 410 may receive the indication of the lower premium and/or discount for the insurance contract, and store the indication in insurance contract 222. IM computer device 410 may generate a new block for insurance contract 222 based upon the indication of the lower premium and/or discount.

In some further embodiments, IM computer device 410 may display the indication of the lower premium and/or discount for insurance contract 222 to driver 115 including an acknowledgement request. When IM computer device 410 receives acknowledgement from driver 115 or vehicle 100, IM computer device 410 stores the acknowledgement in insurance contract 222. IM computer device 410 may generate a new block for insurance contract 222 based upon the acknowledgement. In other embodiments, IM computer device 410 may store an auto-acknowledgement, indicating that driver 115 was informed of the indication of lower premium and/or discount. As a result, risk averse drivers and/or risk averse autonomous vehicle operation or settings may be rewarded with insurance-cost savings.

In some embodiments, with the driver's or vehicle owner's permission or affirmative consent, IM computer device 410 may be constantly monitoring (or alternatively periodically) driver 115 or vehicle 100 to ensure compliance with insurance contract 222. In these embodiments, IM computer device 410 may be constantly cycling through steps 310 through 330 in process 300. In some further embodiments, IM computer device 410 may determine that driver 115 or vehicle 100 is about to be non-compliant with one or more terms and/or conditions of insurance contract 222. In these further embodiments, IM computer device 410 may generate and display a warning to driver 115 about the potential non-compliance, such as if driver 115 is about to deviate too far from route, or exceed an amount of pre-paid miles.

The warning may prompt driver 115 to avoid the potential non-compliant situation. The warning may also offer the driver an addendum or modification to insurance contract 222, in exchange for a premium. For example, a driver 115 may decide to deviate from the predetermined route to visit a scenic location or specific restaurant, or the vehicle may be approached a number of pre-paid miles (such as in the case of UBI (Usage-Based Insurance)). When the IM computer device 410 detects the deviation from the predetermined route, or from an allocated or pre-paid number of insured miles, respectively, IM computer device 410 may display a warning message to driver 115. IM computer device 410 may also display an option for driver 115 to deviate from the predetermined route for an increased premium or a one-time fee, or to purchase an additional number of insured miles. If the user accepts, IM computer device 410 may store the accepted option in a new block in insurance contract 222.

In some still further embodiments, IM computer device 410 may receive, from driver 115, a reason for deviation from the terms and conditions. For example, driver 115 may be deviating from the predetermined route due to a detour. IM computer device 410 may transmit the reason to insurance server, such as UBAIM 220, associated with insurance contract 222 to confirm the driver's reason and determine whether an additional premium is necessary.

In some embodiments, vehicle 100, vehicle controller 110, and/or user computer device 125 may be configured to track driving characteristics of vehicle 100 and/or driver 115 during a trip. Additionally or alternatively, a separate telematics computer device may be provided for use with vehicle 100 (e.g., may be "plugged in" or otherwise coupled to vehicle 100) that tracks driving characteristics. "Driving characteristics" may include, for example (but not limited to), sudden acceleration/deceleration, average speed, average stopping distance, and driving efficiency, as well as times of the day/week vehicle 100 is driven, distance driven, and/or location information of the trip. Vehicle controller 110, user computer device 125, IM computer device 410, and/or UBAIM server 220 may employ machine learning functionality to develop and maintain "driver usage profiles" or "driving profiles" for each driver 115 of vehicle 100 that characterizes the driving of driver 115, such that IM computer device 410 and/or UBAIM server 220 may update or generate a user profile for that driver 115 to include the driving profile. For example, a driver 115 may exhibit one or more high-risk behaviors, according to collected vehicle telematics data (e.g., high occurrence of abrupt deceleration, particularly fast turns, and/or extreme acceleration). The driving profile may include one or more usage characteristics that represent various risk behaviors exhibited (or not exhibited) by driver 115. For instance, one usage characteristic may include a numeric value or other indicator that represents driver 115 rarely drives above a posted speed limit. As another example, another usage characteristic may include a numeric value or other indicator that represents driver 115 frequently drives at "high-risk" times of the day, such as between midnight and 6 AM. As another example, a usage characteristic may be associated with maintenance of the vehicle, such as how often maintenance is performed, or whether or not scheduled maintenance is performed in a timely manner.

In these embodiments, IM computer device 410 and/or UBAIM server 220 may use the driver profile to determine whether or not to generate a lower premium and/or a discount for driver 115 and/or vehicle 100 associated with insurance contract 222 based upon driver's and/or (autonomous) vehicle's driving profile.

IM computer device 410 and/or UBAIM server 220 may access or retrieve telematics data collected by vehicle 100, vehicle controller 110, sensors 105, and/or user computer device 125 to generate the driving profile for driver 115 including the one or more usage characteristics. IM computer device 410 and/or UBAIM server 220 may periodically access or retrieve new or updated telematics data from subsequent trips or subsequent periods of time. IM computer device 410 may update the driving profile and/or usage characteristics based upon the new or updated telematics data. For example, if driver 115 no longer drives at "high-risk" times of the day, IM computer device 410 and/or UBAIM server 220 may update that usage characteristic. When the telematics data shows that driver 115 has reduced one or more risky behaviors, IM computer device 410 and/or UBAIM server 220 may update the driving profile accordingly. IM computer device 410 and/or UBAIM server 220 may update the user profile associated with driver 115, which may provide driver 115 with opportunities for "better" (e.g., cheaper or more comprehensive) premiums for insurance contracts 222.

Exemplary Computer Network

Figure 4:
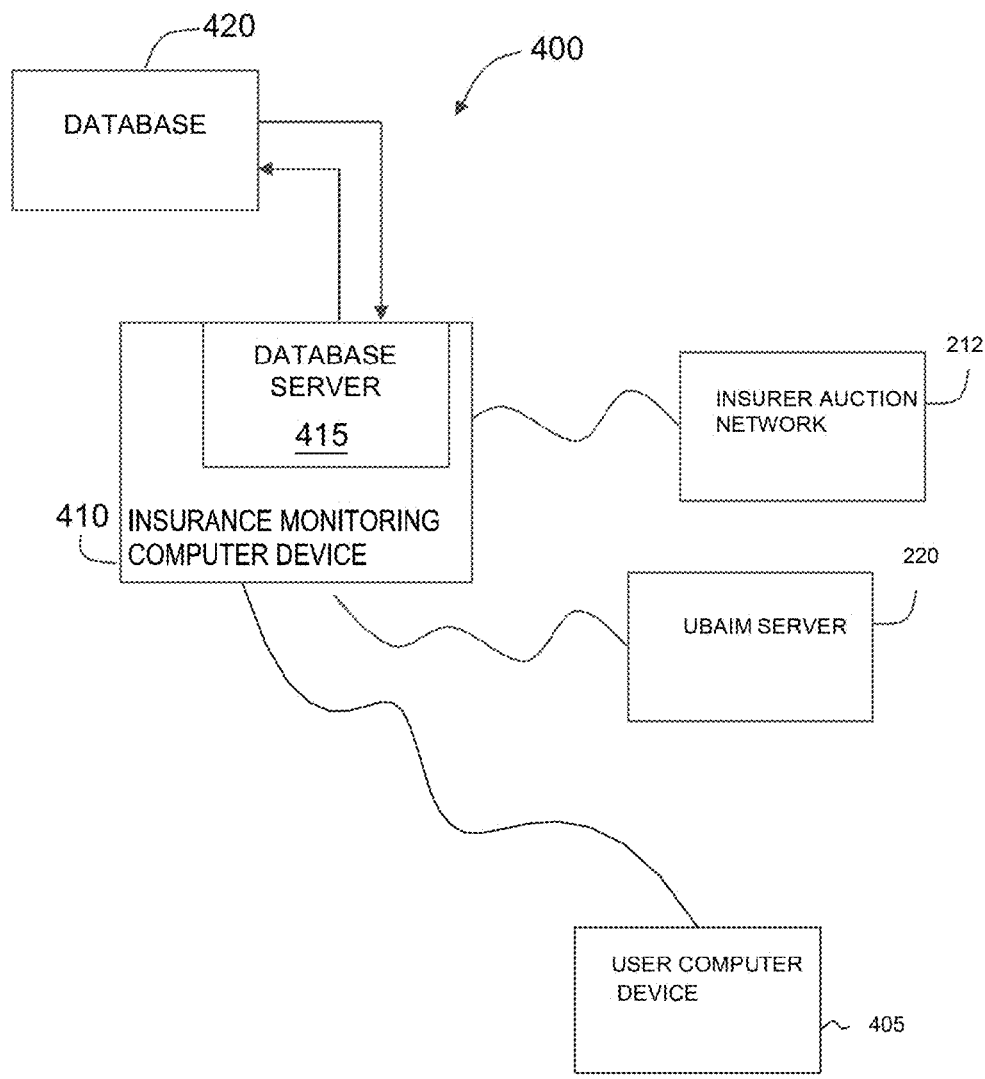
FIG. 4 illustrates a simplified block diagram of an exemplary computer system for implementing the process shown in FIG. 2.

FIG. 4 depicts a simplified block diagram of an exemplary system 400 for implementing process 200 shown in FIG. 2. In the exemplary embodiment, system 400 may be used for managing usage-based insurance using blockchains. As described below in more detail, an insurance monitoring computer device 410 (which may be implemented locally on vehicle, or remotely, such as with a remote server) may be configured to (i) store an insurance contract, such as smart or other electronic contract 222 (shown in FIG. 2) for a currently occurring or impending trip, wherein the insurance contract is for a driver 115 of a vehicle 100 (both shown in FIG. 1) to insure driver 115 and/or vehicle 100 during the currently occurring or impending trip, and where the insurance contract includes one or more terms; (ii) receive sensor information from one or more sensors (such as sensors 105 shown in FIG. 1) associated with vehicle 100, such as via wireless communication or data transmission over one or more radio frequency links or digital communication channels, or wired communication; (iii) compare the received sensor information with the one or more terms of the insurance contract; (iv) determine whether driver 115 and/or vehicle 100 (e.g., an autonomous vehicle) complied with the one or more terms based upon the comparison; and/or (v) if the determination is that driver 115 and/or vehicle 100 complied with the one or more terms, the processor is further programmed to: transmit a notification of driver compliance to an insurance server associated with the insurance contract (such as UBAIM server 220 shown in FIG. 2); and/or store the notification of driver compliance in the insurance contract.

In the exemplary embodiment, user computer devices 405 are computers that include a web browser or a software application, which enables user computer devices 405 to access remote computer devices, such as UBAIM server 220 and insurer auction network 212, using the Internet or other network. More specifically, user computer devices 405 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 405 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, user computer device 405 may also be mobile device 125 and/or vehicle controller 110, both shown in FIG. 1.

A database server 415 may be communicatively coupled to a database 420 that stores data. In one embodiment, database 420 may include the smart contract 222 (shown in FIG. 2) for the active trip, sensor data, modifications to smart contract 222, and/or other smart contracts 222. In the exemplary embodiment, database 420 may be stored remotely from UBAIM server 220 and IM computer device 410. In some embodiments, database 420 may be decentralized. In the exemplary embodiment, a user, such as driver 115, may access database 420 via user computer device 405 by logging onto IM computer device 410 or UBAIM server 220, as described herein.

IM computer device 410 may be communicatively coupled with one or more user computer devices 405. In some embodiments, IM computer device 410 may also be communicatively coupled with vehicle controller 110. In other embodiments, IM computer device may be vehicle controller 110. In still other embodiments, IM computer device 410 may be a mobile computer device 125, such the driver's smartphone. In some embodiments, IM computer device 410 may be associated with, or is part of a computer network associated with an insurance provider, or in communication with the insurance provider's computer network (not shown). In other embodiments, IM computer device 410 may be associated with a third party and is merely in communication with the insurance provider's computer network. More specifically, IM computer device 410 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

IM computer device 410 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In still further embodiments, IM computer device 410 may be separate from both vehicle controller 110 and mobile device 125 and merely be in communication with them to monitor driver 115 and vehicle 100.

UBAIM server 220 may be in communication with a plurality of IM computer devices 410 that are simultaneously monitoring a plurality of vehicles 100 and drivers 115. Furthermore, in some embodiments, the plurality of IM computer devices 410 may be configured in a network that allows the IM computer devices 410 to communicate changes to blockchains that the various IM computer devices 410 are storing, where each IM computer device 410 is a node. In addition, UBAIM server 220 may be a node of this blockchain network. UBAIM server 220 may also be a super node of the blockchain network and manage communications between the various IM computer devices 420.

Exemplary Client Device

Figure 5:
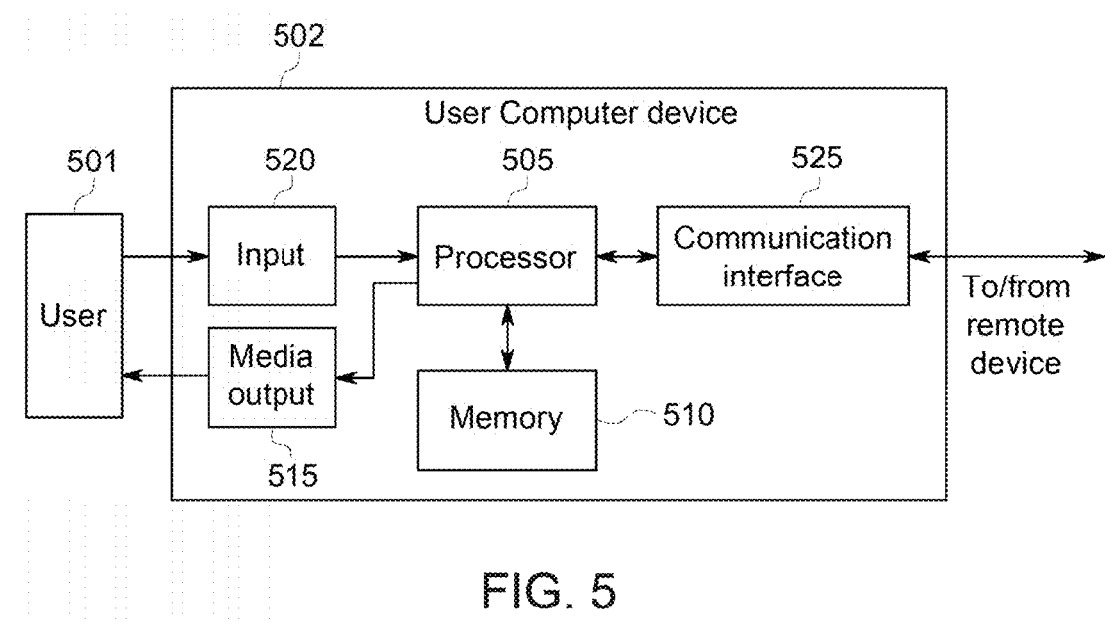
FIG. 5 illustrates an exemplary configuration of a client computer device shown in FIG. 4, in accordance with one embodiment of the present disclosure.

FIG. 5 depicts an exemplary configuration of user computer device 405 shown in FIG. 4, in accordance with one embodiment of the present disclosure. User computer device 502 may be operated by a user 501. User computer device 502 may include, but is not limited to, user computer devices 405, IM computer device 410 (both shown in FIG. 4), mobile device 125, and vehicle controller 110 (both shown in FIG. 1). User computer device 502 may include a processor 505 for executing instructions. In some embodiments, executable instructions may be stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, an online store interface for viewing and/or purchasing items, and/or a wallet application for managing payment information. In some embodiments, user computer device 502 may include an input device 520 for receiving input from user 501. User 501 may use input device 520 to, without limitation, select and/or enter one or more items about trip and access information about trip and/or insurance contract 222 (shown in FIG. 2).

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as UBAIM server 220 (shown in FIG. 2) or insurer auction network 212 (both shown in FIG. 2). Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from UBAIM server 220. A client application may allow user 501 to interact with, for example, UBAIM server 220. For example, instructions may be stored by a cloud service, and the output of the execution of the instructions sent to the media output component 515.

Exemplary Server Device

Figure 6:
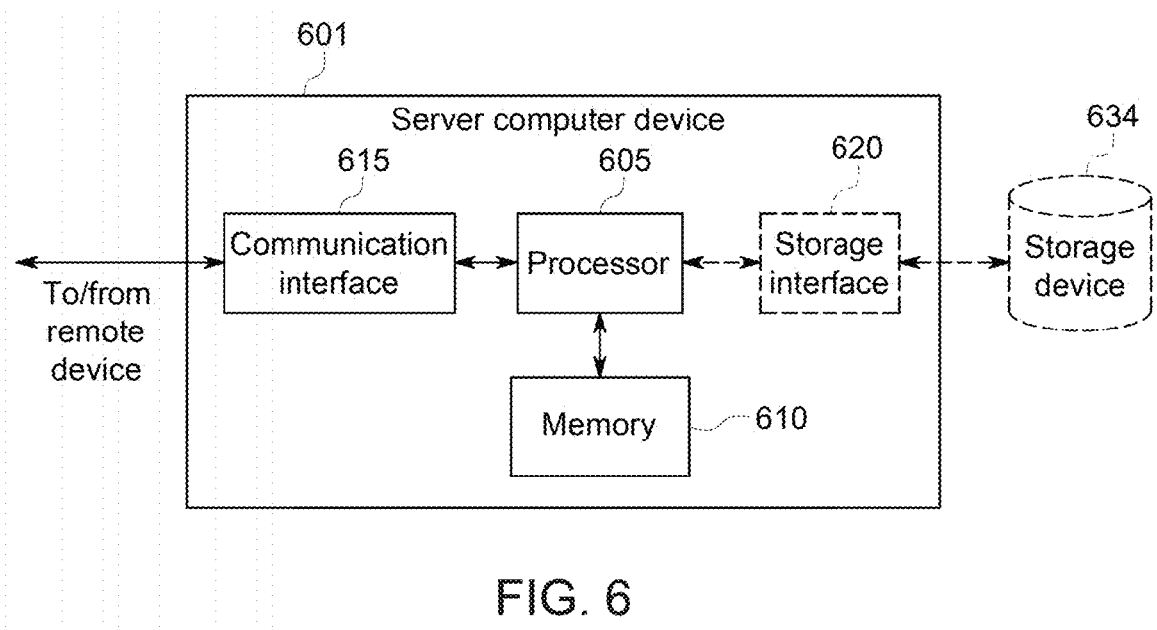
FIG. 6 illustrates an exemplary configuration of a server shown in FIG. 4, in accordance with one embodiment of the present disclosure.

FIG. 6 depicts an exemplary configuration of server 415 shown in FIG. 4, in accordance with one embodiment of the present disclosure. Server computer device 601 may include, but is not limited to, UBAIM server 220, insurer auction network 212 (both shown in FIG. 2), IM computer device 410, and database server 415 (both shown in FIG. 4). Server computer device 601 may also include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 601 is capable of communicating with a remote device such as another server computer device 601, UBAIM server 220, vehicle controller 110, mobile device 125 (both shown in FIG. 1), IM computer device 410, and user computer devices 405 (shown in FIG. 4) (for example, using wireless communication or data transmission over one or more radio links or digital communication channels. For example, communication interface 615 may receive requests from user computer devices 405 via the Internet, as illustrated in FIG. 4.

Processor 605 may also be operatively coupled to a storage device 634. Storage device 634 may be any computer-operated hardware suitable for storing and/or retrieving data, such as, but not limited to, data associated with database 420 (shown in FIG. 4). In some embodiments, storage device 634 may be integrated in server computer device 601. For example, server computer device 601 may include one or more hard disk drives as storage device 634.

In other embodiments, storage device 634 may be external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 may be operatively coupled to storage device 634 via a storage interface 620. Storage interface 620 may be any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 may execute computer-executable instructions for implementing aspects of the disclosure. In some embodiments, the processor 605 may be transformed into a special purpose microprocessor by executing computer-executable instructions or by otherwise being programmed. For example, the processor 605 may be programmed with the instruction such as illustrated in FIGS. 3 and 11-13.

Exemplary Process for Multi-Carrier Auction

Figure 7:
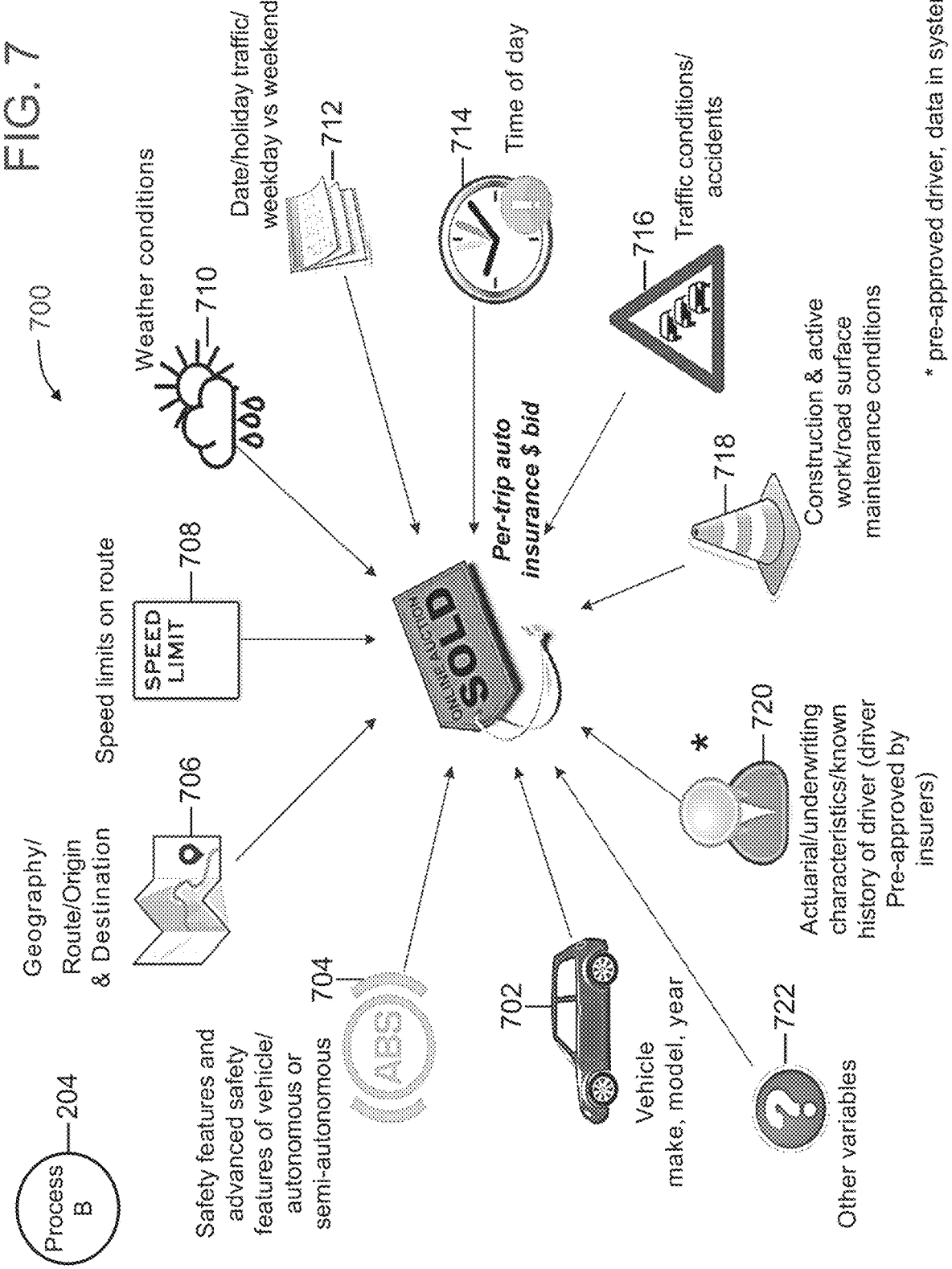
FIG. 7 illustrates a flow chart of an exemplary process of managing a multi-carrier auction network for bidding on the individual trip insurance as shown in FIG. 2 using the system shown in FIG. 4.

FIG. 7 illustrates a flowchart of an exemplary computer-implemented process 700 of managing a multi-carrier auction network 212 for bidding on the individual trip insurance as shown in FIG. 2 using system 400 shown in FIG. 4. Process 700 is a part of Process B 204 (shown in FIG. 2).

Process 700 illustrates the data that may be collected to determine the bids for the trip insurance. From the trip information provided by driver 115 (shown in FIG. 1), insurance auction system 212 (shown in FIG. 2) may collect the starting point, destination, dates, and/or times 714 of driver's trip. From this and/or other information, insurer auction network 212 may be also able to determine or retrieve the weather conditions 710 during the trip, the geography 706 of the trip including information on the roads and road conditions between the starting point and destination, the speed limits 708 on those roads, and/or estimated traffic patterns 712 on those roads during the dates and times of the trip, such as weekend/weekday/holiday traffic patterns 712. Insurer auction network 212 may also determine current accidents and/or traffic conditions 716 on the roads. In other cases, insurer auction network 212 may determine the likelihood of vehicle collisions on the roads during the trip.

From the vehicle 100 (shown in FIG. 1), insurer auction network 212 may be able to determine the make, model, and year 702 of vehicle 100. From this information, insurer auction network 212 may be able to determine the safety features 704 and/or safety record of vehicle 100. This information may include whether vehicle is autonomous or semi-autonomous. Other variables 722 that are important to insurers 214 may also be collected as necessary to determine a price for a bid.

The types of autonomous or semi-autonomous vehicle-related functionality or technology that may be used with the present embodiments include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering, acceleration, braking, collision warning, and/or blind spot monitoring; (f) adaptive cruise control; (g) automatic or semi-automatic parking/parking assistance and/or collision preparation (windows roll up, seat adjusts upright, brakes pre-charge, etc.); (h) driver acuity/alertness monitoring; (i) pedestrian detection; (j) autonomous or semi-autonomous backup systems; (k) road mapping or navigation systems; (l) software security and anti-hacking measures; (m) theft prevention/automatic return; (n) automatic or semi-automatic driving without occupants; and/or other functionality.

The adjustments to automobile insurance rates or premiums based upon the autonomous or semi-autonomous vehicle-related functionality or technology may take into account the impact of such functionality or technology on the likelihood of a vehicle accident or collision occurring. For instance, a processor may analyze historical accident information and/or test data involving vehicles having autonomous or semi-autonomous functionality. Factors that may be analyzed and/or accounted for that are related to insurance risk, accident information, or test data may include (1) point of impact; (2) type of road; (3) time of day; (4) weather conditions; (5) road construction; (6) type/length of trip; (7) vehicle style; (8) level of pedestrian traffic; (9) level of vehicle congestion; (10) atypical situations (such as manual traffic signaling); (11) availability of internet connection for the vehicle; and/or other factors. These types of factors may also be weighted according to historical accident information, predicted accidents, vehicle trends, test data, and/or other considerations.

In some embodiments, insurer auction network 212 may also be able to collect actuarial data, underwriting characteristics, and any known history 720 of driver 115 or vehicle (such as in the case of an autonomous vehicle). For example, if driver had been pre-approved by one or more insurers 214 in insurer auction network 212. The historical data of the driver 115 or the vehicle may also include telematics data, as discussed herein, such as sensor data collected by various sensors mounted on the vehicle or on a driver's or passenger's mobile device that detect various conditions of vehicle used during past or current trips, including speed, acceleration, gear, braking, cornering, miles driven or operated, GPS location, and/or other conditions related to the operation of vehicle.

Each insurer 214 in insurer auction network 212 may analyze some or all of the above data to generate a bid for the trip.

In some embodiments, the data about the trip 702-722 is collected by IM computer device 410 (shown in FIG. 4). IM computer device 410 transmits the trip data 702-722 to insurance auction network 212. Insurance auction network 212 provides the trip data 702-722 to each insurer 214. Based upon trip data 702-722, each insurer 214 determines whether or not to bid on the trip. If the determination is yes, then insurer 214 calculates a bid based upon trip data 702-722. In some embodiments, insurer 214 uses an UBAIM server 220 associated with insurer 214 to calculate the bid. Insurer 214 transmits the bid to insurance auction network 212, which collects the bids and transmits the bids to IM computer device 410 to present to driver 115.

In other embodiments, IM computer device 410 only includes a portion of trip data 702-722 in the transmission to insurance auction network 212. In these other embodiments, insurance auction network 212 collects the additional information prior to transmitting trip data 702-722 to insurers 214. For example, IM computer device 410 may collect year, make, and model 702 and insurance auction network 212 may have to determine the safety features 704 of vehicle 100 based upon year, make, and model 702.

In still further embodiments, insurance auction network 212 only provides the information received from IM computer device 410. In these embodiments, each insurer 214 is responsible for determining and collecting the additional information that it deems important or necessary.

In some embodiments, insurance auction network 212 may be provided with one or more driver usage profiles of driver 115 of vehicle that may include one or more driving characteristics of driver 115. In these embodiments, vehicle 100, vehicle controller 110, and/or user computer device 125 (both shown in FIG. 1) may be configured to track driving characteristics of vehicle 100 and/or driver 115 (shown in FIG. 1) during a trip. Additionally or alternatively, a separate telematics computer device may be provided for use with vehicle 100 (e.g., may be "plugged in" or otherwise coupled to vehicle 100) that tracks driving characteristics. "Driving characteristics" may include, for example (but not limited to), sudden acceleration/deceleration, average speed, average stopping distance, and driving efficiency, as well as times of the day/week vehicle 100 is driven, distance driven, and/or location information of the trip. Vehicle controller 110, user computer device 125, IM computer device 410, and/or UBAIM server 220 may employ machine learning functionality to develop and maintain "driver usage profiles" or "driving profiles" for each driver 115 of vehicle 100 that characterizes the driving of driver 115, such that IM computer device 410 and/or UBAIM server 220 may update or generate a user profile for that driver 115 to include the driving profile. For example, a driver 115 may exhibit one or more high-risk behaviors, according to collected vehicle telematics data (e.g., high occurrence of abrupt deceleration, particularly fast turns, and/or extreme acceleration). The driving profile may include one or more usage characteristics that represent various risk behaviors exhibited (or not exhibited) by driver 115. For instance, one usage characteristic may include a numeric value or other indicator that represents driver 115 rarely drives above a posted speed limit. As another example, another usage characteristic may include a numeric value or other indicator that represents driver 115 frequently drives at "high-risk" times of the day, such as between midnight and 6 AM. As another example, a usage characteristic may be associated with maintenance of the vehicle, such as how often maintenance is performed, or whether or not scheduled maintenance is performed in a timely manner.

In some embodiments, multiple users may have access to vehicle 100, such that one or more users may act as driver 115 for different trips undertaken using vehicle 100. Accordingly, vehicle controller 110 may be configured to determine which of these users is acting as driver 115 for each trip, such that telematics data associated with any particular trip may be correctly attributed to a driving profile for the correct driver 115.

IM computer device 410 and/or UBAIM server 220 may access or retrieve telematics data collected by vehicle 100, vehicle controller 110, sensors 105, and/or user computer device 125 to generate the driving profile for driver 115 including the one or more usage characteristics. IM computer device 410 and/or UBAIM server 220 may periodically access or retrieve new or updated telematics data from subsequent trips or subsequent periods of time. IM computer device 410 may update the driving profile and/or usage characteristics based upon the new or updated telematics data. For example, if driver 115 no longer drives at "high-risk" times of the day, IM computer device 410 and/or UBAIM server 220 may update that usage characteristic. When the telematics data shows that driver 115 has reduced one or more risky behaviors, IM computer device 410 and/or UBAIM server 220 may update the driving profile accordingly. IM computer device 410 and/or UBAIM server 220 may update the user profile associated with driver 115, which may provide driver 115 with opportunities for "better" (e.g., cheaper or more comprehensive) bids from insurers 214 in insurance auction network 212.

In these embodiments, IM computer device 410 and/or UBAIM server 220 may provide the telematics-based usage profiles to the insurance auction network 212 as a part of process 204. In these embodiments, insurance provider 214 may take into account the user's driving characteristics in generating a bid for the trip.

Exemplary Process for Monitoring a Driver in Relation to an Insurance Contract

Figure 8:
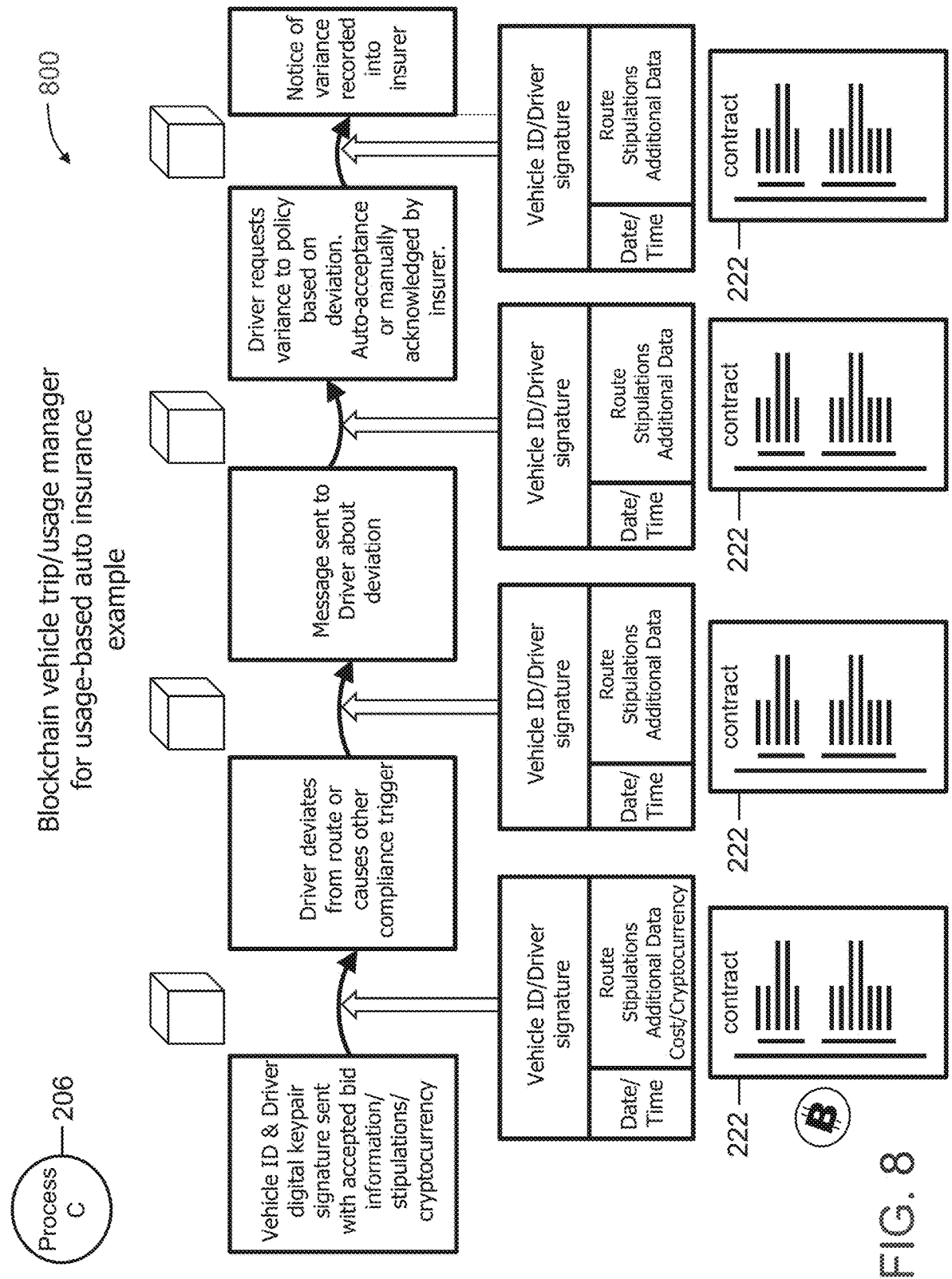
FIG. 8 illustrates a flow chart of an exemplary process of the monitoring and managing a driver's actions in relation to an insurance contract as shown in FIG. 3 using the system shown in FIG. 4.

FIG. 8 illustrates a flow chart of an exemplary computer-implemented process 800 of the monitoring and managing a driver's actions in relation to insurance contract 222 as shown in FIGS. 2 and 3 using system 400 shown in FIG. 4.

In the exemplary embodiment, when driver 115 (shown in FIG. 1) and/or vehicle 100 (shown in FIG. 1) accepts a bid, a digital signature is sent with the acceptance. In the exemplary embodiment, the digital signature is a combination of a vehicle identifier and/or a driver identifier. The digital signature is included in a block insurance contract 222 along with the date, time, the route, stipulations, additional data, cost, and/or the cryptocurrency tied to the exchange.

When driver and/or vehicle deviates from the route, and/or more generally, when the driver or vehicle causes a compliance trigger to activate, IM computer device 410 (shown in FIG. 4) may determine that driver 115 or vehicle 100 is about to be non-compliant with one or more terms and/or conditions of insurance contract 222. In these further embodiments, IM computer device 410 displays a warning to driver 115 about the potential non-compliance, such as if driver 115 is about to deviate too far from route. The warning may prompt driver 115 to avoid the potential non-compliant situation. The warning may also offer the driver an addendum or modification to insurance contract 222, in exchange for a premium. For example, a driver 115 may decide to deviate from the predetermined route to visit a scenic location or specific restaurant. When the IM computer device 410 detects the deviation from the predetermined route, IM computer device 410 displays a warning message to driver 115. IM computer device 410 may also display an option for driver 115 to deviate from the predetermined route for an increased premium or a one-time fee. If the user accepts, IM computer device 410 stores the accepted option in a new block in insurance contract 222.

In some still further embodiments, IM computer device 410 may receive, from driver 115, a reason for deviation from the terms and conditions. For example, driver 115 may be deviating from the predetermined route due to a detour. IM computer device 410 transmits the reason to insurance server, such as UBAIM 220 (shown in FIG. 2), associated with insurance contract 222 to confirm the driver's reason and determine whether an additional premium is necessary.

In some embodiments, when IM computer device 410 displays the warning, driver 115 may request a variance to insurance contract 222 based upon the deviation. IM computer device 410 may transmit the request to UBAIM server 222. UBAIM server 222 may decide whether or not to accept the requested variance. In some embodiments, UBAIM server 222 may consult a set of rules that allow it to determine whether or not to accept the requested variance. The rules may also include instructions on when to alert a supervisor to review the requested variance. The rules may be based upon the driver's or the vehicle's (such as in the case of an autonomous or semi-autonomous vehicle) past actions during the trip and on previous trips. If the requested variance is accepted, then a notification is transmitted to IM computer device 410 and the notification is stored in a block of insurance contact 222.

Exemplary System for Blockchain Mining

Figure 9:
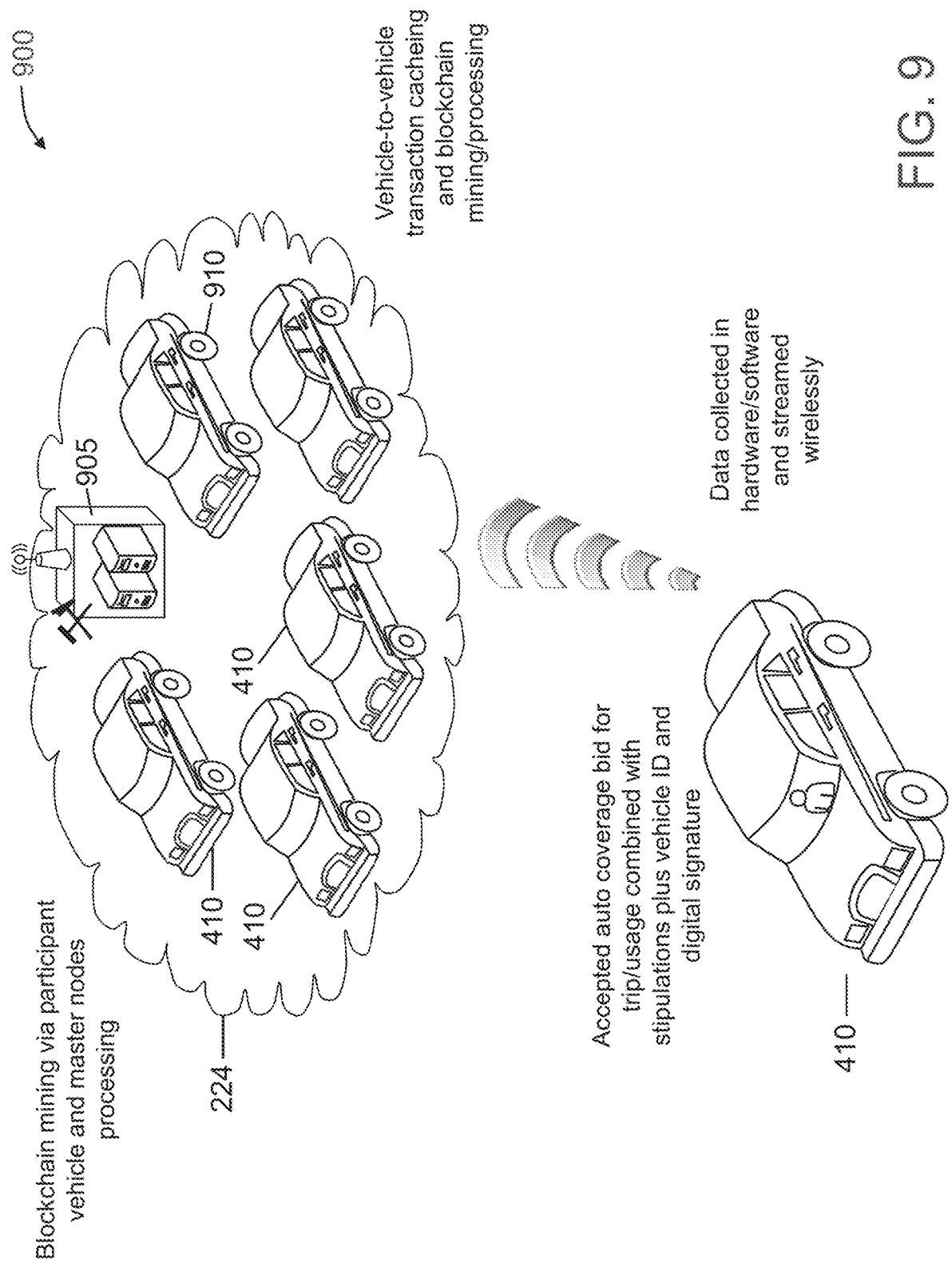
FIG. 9 illustrates a block diagram of an exemplary blockchain mining system in accordance with FIG. 2.

FIG. 9 illustrates a block diagram of a blockchain mining system 900 in accordance with FIG. 2.

A blockchain may be a distributed database that maintains a continuously-growing list of ordered records, known as blocks. Each block may contain at least a timestamp and a link to the previous block in the chain. The link to the previous block may be a hash of the previous block. For insurance contract 222 (shown in FIG. 2), the first block may contain the initial contract between driver 115 (shown in FIG. 1) and insurer 214 (shown in FIG. 2). The second block may contain a modification to the contract that was requested by driver 115 and approved by insurer 214. The second block may contain a hashed copy of the first block as well. The third block may contain one or more additional claims for insurance contract 222 and a hashed copy of the second block. This continues on with each block adding on to the next while containing a hash of the previous blocks in the blockchain.

To ensure the security of the information contained in the blockchain, copies of the blockchain may be distributed across multiple computer devices, known as nodes. These nodes maintain the blockchain, update the blockchain when changes occur, and ensure the stability of the blockchain itself. In some embodiments, nodes may also be used to calculate the hash of the previous blocks. As the blockchain grows, the processing power needed to calculate the hash of the previous blocks grows as well. In these embodiments, the processing of the hash may be distributed over multiple computer devices to improve the speed of processing and/or to not overburden the hashing processor. When a node processes (hashes) a block, that node is known as a miner, where the action of validating and hashing the block is known as mining.

Blockchain mining system 900 may include a supernode 905 and a plurality of nodes 910. Some nodes may just be storing the latest copy of the blockchain. Other nodes may be miners and are processing blocks in the blockchain. In the exemplary embodiment, IM computer device 410 may be associated with a trip that includes an insurance contract 222 (shown in FIG. 2).

Supernode 905 monitors blockchain ledger 224 and the integrity of system 900. For example, supernode 905 may monitor when different nodes 910 go offline or become unavailable. Supernode 905 may also add nodes 910 to system 900 and ensure that nodes 910 have up-to-date copies of the blockchain. In system 900, each node 910 may be an IM computer device 410 associated with a vehicle 100.

In some embodiments, a blockchain may be maintained for each insurance contract 222. In other embodiments, each insurer 214 maintains one or more blockchains where each blockchain contains the transactions from multiple insurance contracts 222. These blockchains may be divided up by geological region, chronologically, or any other division that allows the systems to operate as described herein.

When a bid is accepted, IM computer device 410 may wirelessly stream the data to be added to the blockchain. This data may be added to the appropriate blocks along with the vehicle identifier and digital signature. The data may be passed to the various nodes 910 in system 900, where the data will be stored in blockchains in each of the various nodes 910 storing the blockchain. In some embodiments, the data may be transferred and each node 910 generates the next block in the blockchain. In other embodiments, the originating node 910 may generate the next block and transmits the block to the other nodes 910. In still other embodiments, supernode 905 may generate the next block and transmit the block to the nodes 910.

Another Exemplary System for Blockchain Mining

Figure 10:
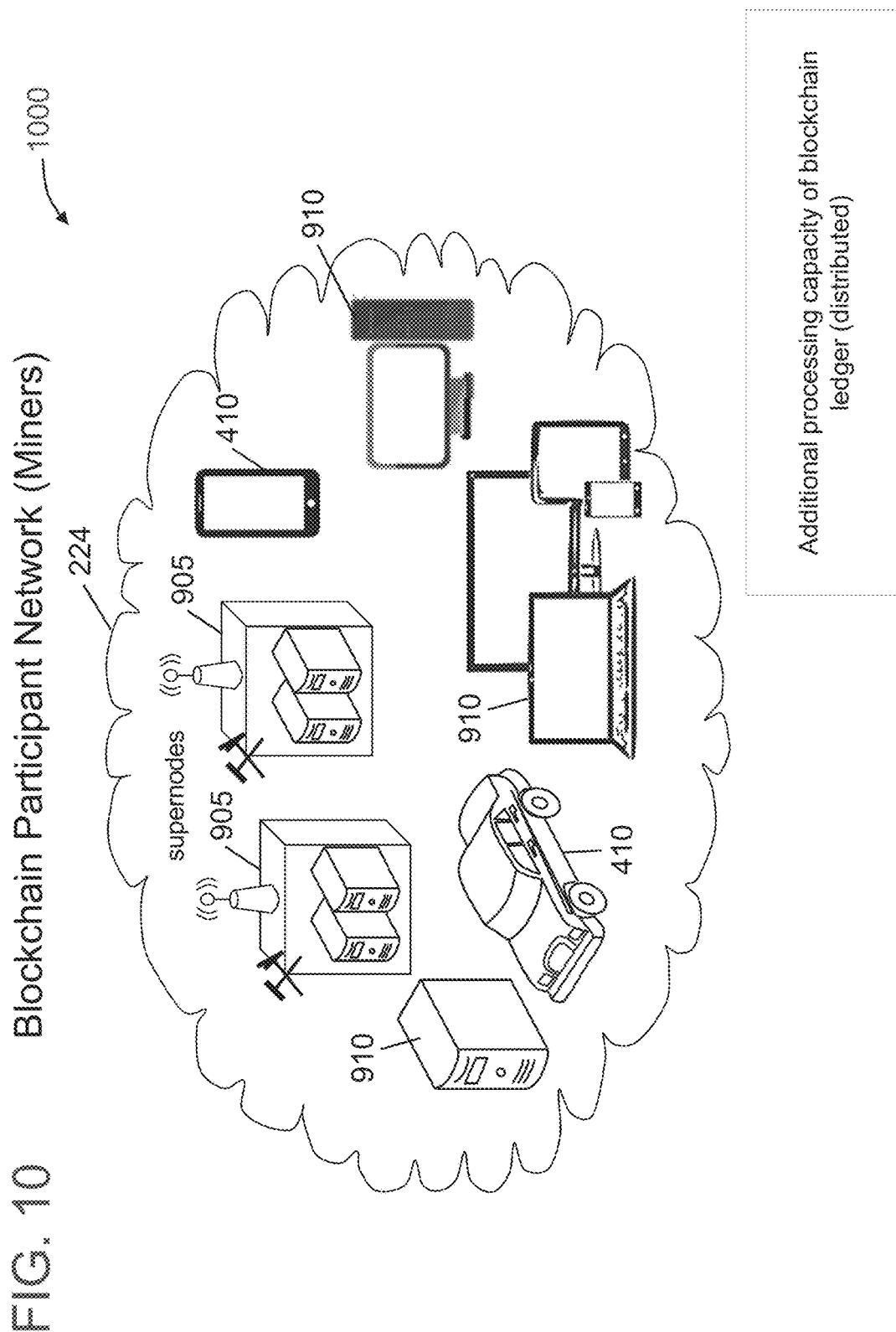
FIG. 10 illustrates another block diagram of an exemplary blockchain mining system in accordance with FIG. 2.

FIG. 10 illustrates another block diagram of a blockchain mining system 1000 in accordance with FIG. 2. System 1000 shows another version of the plurality of nodes 910 that may be used in blockchain ledger 224.

System 1000 may include supernodes 905, IM computer devices 410, mobile devices 125, and nodes 910 that are not a part of vehicle 100. System 1000 may include a plurality of nodes 910 from a plurality of sources to improve or increase the size and the integrity of blockchain ledger 224. Nodes 910 that are in addition to IM computer device 410 may include other computer devices of insurer 214 (shown in FIG. 2). Nodes 910 may also include computer devices, such as servers, workstations, and mobile devices of a blockchain federation or network that may extend outside of the control of insurer 214.

Exemplary Computer-Implemented Method for Managing Usage-Based Insurance

Figure 11:
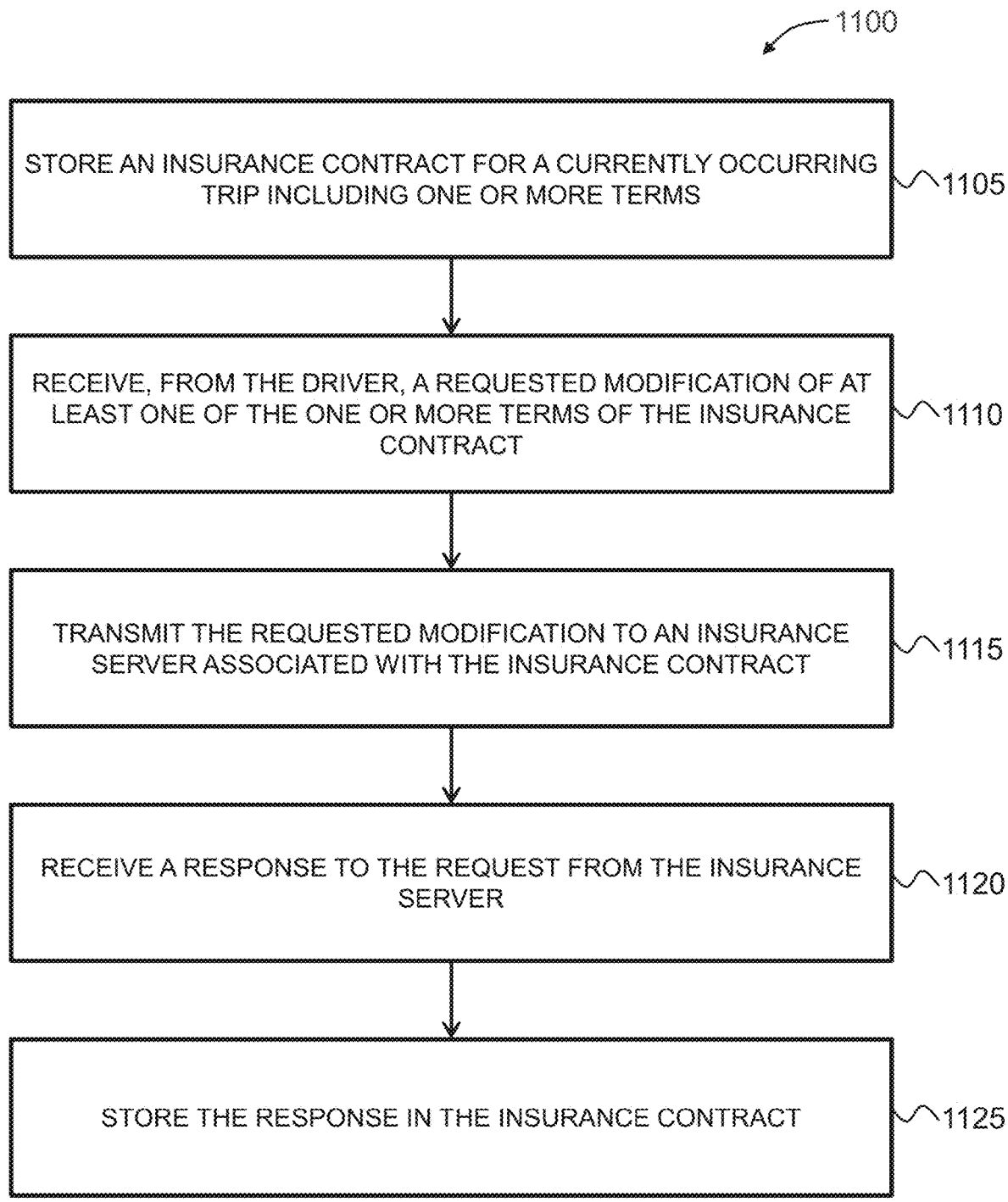
FIG. 11 illustrates a flow chart of an exemplary computer-implemented process of another aspect of managing usage-based insurance using the system shown in FIG. 4.

FIG. 11 illustrates a flow chart of an exemplary computer-implemented process of yet another aspect of managing usage-based insurance using the system shown in FIG. 4. Process 1100 may be implemented by a computing device, for example IM computer device 410 (shown in FIG. 4). In the exemplary embodiment, IM computer device 410 may be in communication with a user computer device 405 (shown in FIG. 4), such as vehicle controller 110 and mobile computer device 125 (both shown in FIG. 1), an insurer auction network 212 (shown in FIG. 2), a User Based Auto Insurance Management ("UBAIM") system 220 (shown in FIG. 2), and a plurality of nodes for the blockchain ledger 224 (shown in FIG. 2).

In the exemplary embodiment, IM computer device 410 may store 1105 an insurance contract, such as a smart or other electronic contract 222 (shown in FIG. 2), for a currently occurring or impending trip. Insurance contract 222 may be for driver 115 of vehicle 100 (both shown in FIG. 1) to insure driver 115 and/or vehicle 100 during the currently occurring or impending trip. Insurance contract 222 may include one or more terms. The one of more terms may define restrictions that the insurance provider 214 (shown in FIG. 2) associated with insurance contract 222 has written into insurance contract 222. Examples of restrictions include, but are not limited to, maximum speed, maximum travel time per day, minimum safe following distance, and other driving behaviors that insurer 214 wishes to control.

In the exemplary embodiment, insurance contract 222 may be stored in a blockchain structure, such as blockchain ledger 224 (shown in FIG. 2). Blockchain ledger 224 may be include a plurality of nodes store copies of insurance contract 222.

In the exemplary embodiment, IM computer device 410 may receive 1110 a request to modify at least one of the one or more terms of insurance contract 222 from driver 115 and/or vehicle 100. For example, driver 115 and/or vehicle 100 may request to deviate from the predetermined route to visit a scenic location or a specific restaurant.

IM computer device 410 transmits 1115 the requested modification to an insurance server, such as UBAIM 220, associated with insurance contract 222. IM computer device 410 may receive 1120 a response to the request from the insurance server and store the response in insurance contract 222.

In some embodiments, the response includes one or more additional terms, such as an additional cost for the modification, and/or additional coverages, deductibles, or other obligations, terms, and/or conditions of the insurance contract. IM computer device 410 may display the one or more additional terms to driver 115 for approval, such as through a display of vehicle controller 110. When IM computer device 410 receives approval of the one or more additional terms from driver 115, IM computer device 410 may store the one or more additional terms in insurance contract 222.

In the exemplary embodiment, the insurance contract may be in a blockchain structure. And a plurality of nodes 910 (shown in FIG. 9) may store copies of insurance contract 222 in the blockchain structure, such as blockchain ledger 224, as described above.

In some embodiments, IM computer device 410 may generate a new block for insurance contract 222 based upon the requested modification and the response, and update insurance contract 222 with the new block. In some further embodiments, IM computer device 410 may transmit the new block the plurality of nodes 910. And each the plurality of nodes 910 may be configured to update their stored copies of insurance contract 222 with the new block.

In other embodiments, IM computer device 410 may transmit the requested modification and the response to the plurality of nodes 910. And each of the plurality of nodes may be configured to generate a new block based upon the requested modification and the response and update their stored copies of insurance contract 222 with the generated block.

In some embodiments, IM computer device 410 may determine that driver is about to violate one of the one or more terms of insurance contract 222, such as by leaving the predetermined route. IM computer device 410 may bring this to the attention of driver 115 and ask if driver 115 wishes to request a modification to insurance contract 222.

Exemplary Computer-Implemented Method for Managing Usage-Based Insurance

Figure 12:
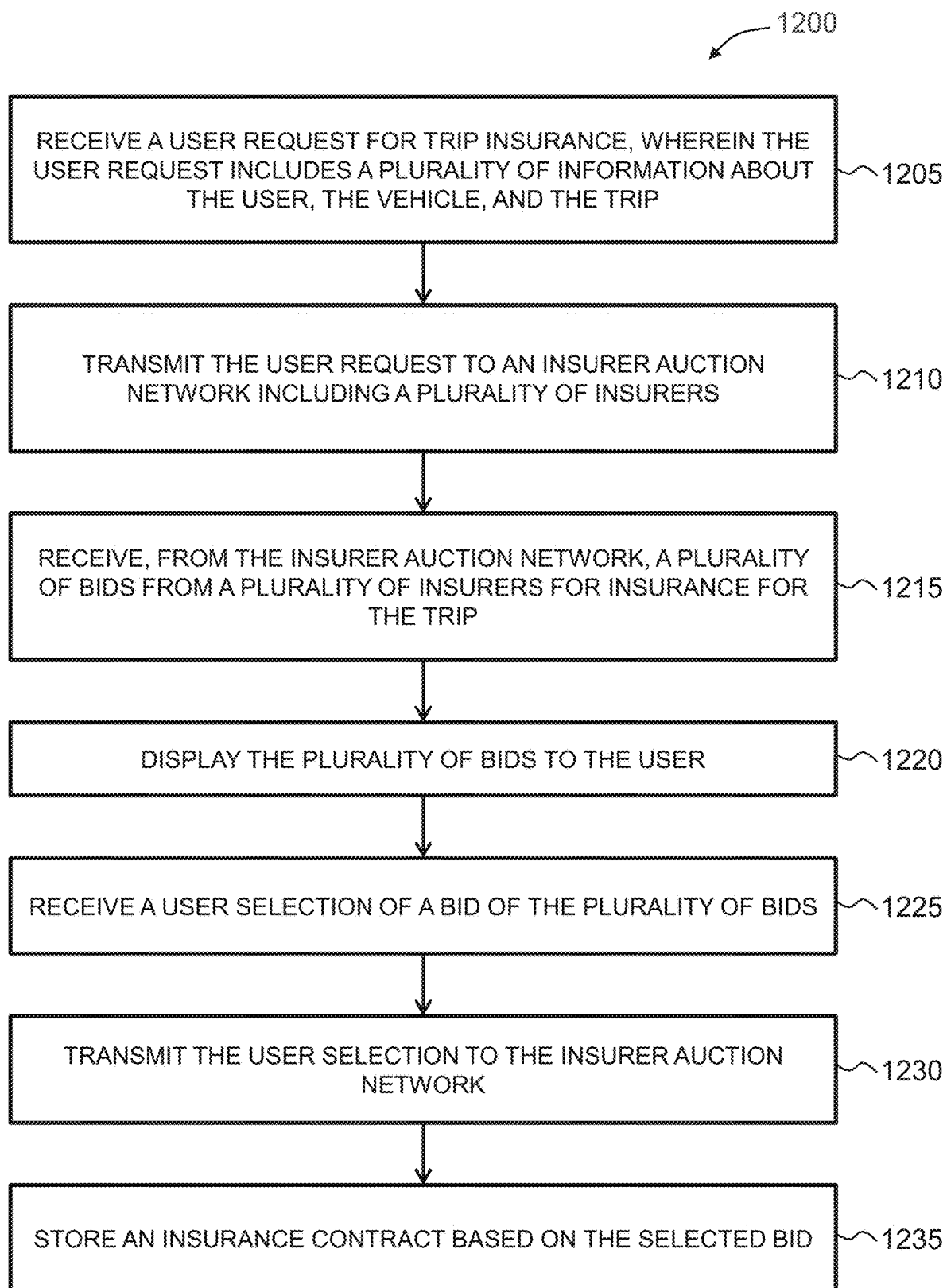
FIG. 12 illustrates a flow chart of an exemplary computer-implemented process of yet another aspect of managing usage-based insurance using the system shown in FIG. 4.

FIG. 12 illustrates a flow chart of an exemplary computer-implemented process 1200 of yet another aspect of managing usage-based insurance using the system shown in FIG. 4. Process 1200 may be implemented by a computing device, for example IM computer device 410 (shown in FIG. 4). In the exemplary embodiment, IM computer device 410 may be in communication with a user computer device 405 (shown in FIG. 4), such as vehicle controller 110 and mobile computer device 125 (both shown in FIG. 1), an insurer auction network 212 (shown in FIG. 2), a User Based Auto Insurance Management ("UBAIM") system 220 (shown in FIG. 2), and a plurality of nodes for the blockchain ledger 224 (shown in FIG. 2).

In the exemplary embodiment, IM computer device 410 may (locally or remotely) receive 1205 a user request for trip insurance. The user request may include a plurality of information about the user (the driver 115), vehicle 100 (shown in FIG. 1), and the trip. IM computer device 410 may transmit 1210 the user request to insurer auction network 212 (such as via wireless communication or data transmission over one or more radio links or digital communication channels). As described in FIG. 7, insurers 214 (shown in FIG. 2) in insurer auction network 212 may generate a plurality of bids for the insurance for the trip.

IM computer devices 410 may receive 1215, from insurer auction network 212, the plurality of bids from a plurality of insurers 214 for insurance for the trip. IM computer device 410 may display 1220 the plurality of bids to the user, such as through the display of vehicle 100 or mobile device 125.

IM computer device 410 may receive 1225 a user selection of a bid of the plurality of bids. IM computer device 410 may transmit 1230 the user selection to insurer auction network 212. IM computer device 410 may store 1235 an insurance contract 222 based upon the selected bid.

In some embodiments, IM computer device 410 may generate the insurance contract 222 based upon the user request and the selected bid. In other embodiments, IM computer device 410 may receive the insurance contract 222 from an insurance server, such as UBAIM 220, associated with the selected bid. In the exemplary embodiment, the insurance contract may be in a blockchain structure. And a plurality of nodes 910 (shown in FIG. 9) may store copies of insurance contract 222 in the blockchain structure, such as blockchain ledger 224 (shown in FIG. 2), as described above.

Exemplary Computer-Implemented Method for Managing Usage-Based Insurance

Figure 13:
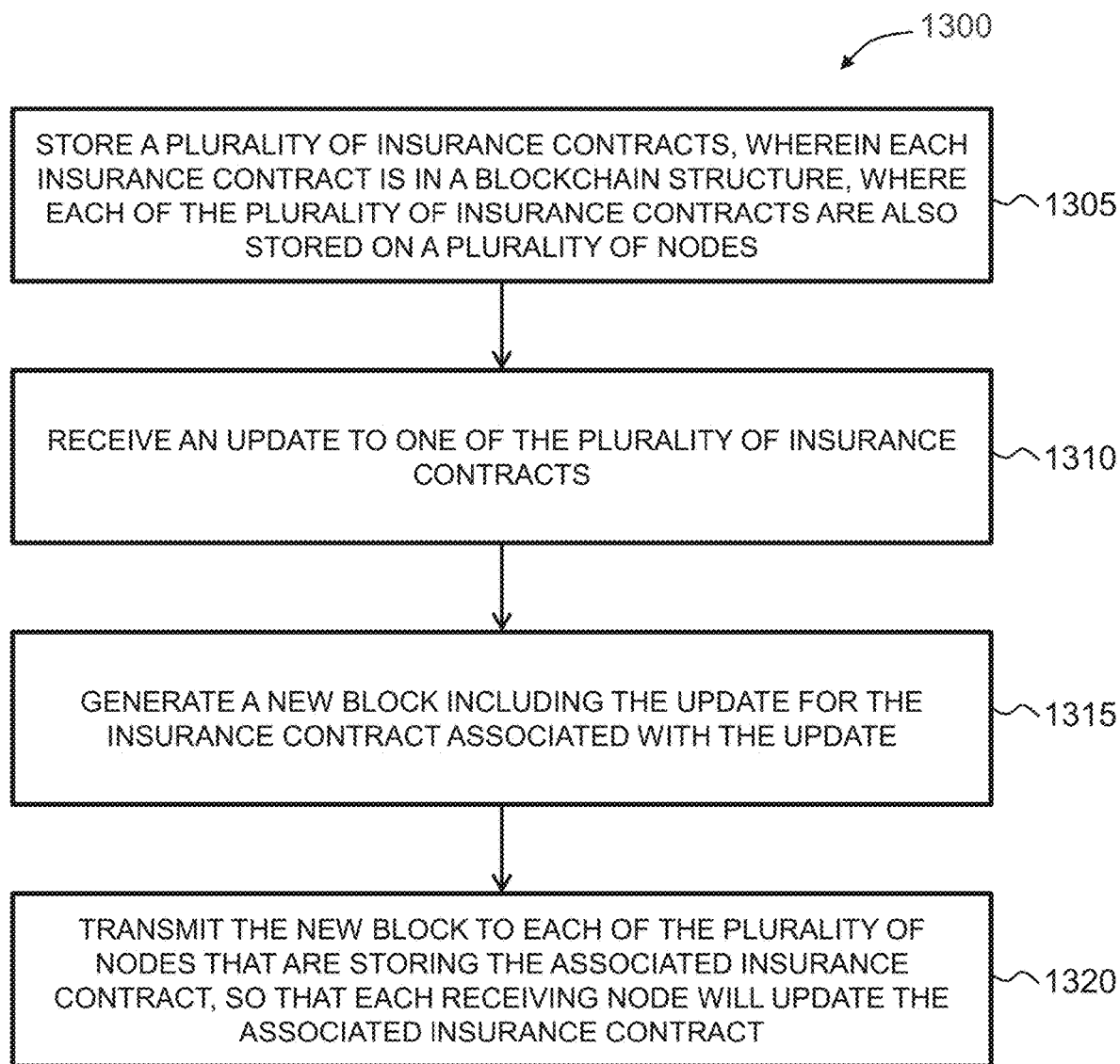
FIG. 13 illustrates a flow chart of an exemplary computer-implemented process of managing a plurality of insurance contracts in accordance with FIGS. 9 and 10 using the system shown in FIG. 4.

FIG. 13 illustrates a flow chart of an exemplary computer-implemented process 1300 of managing a plurality of insurance contracts 222 (shown in FIG. 2) in accordance with FIGS. 9 and 10 using system 400 shown in FIG. 4. Process 1300 may be implemented by a computing device, for example IM computer device 410 (shown in FIG. 4). In some embodiments, process 1300 may be performed by a supernode 905 (shown in FIG. 9). In the exemplary embodiment, IM computer device 410 may be in communication with a user computer device 405 (shown in FIG. 4), such as vehicle controller 110 and mobile computer device 125 (both shown in FIG. 1), an insurer auction network 212 (shown in FIG. 2), a User Based Auto Insurance Management ("UBAIM") system 220 (shown in FIG. 2), and a plurality of nodes 910 (shown in FIG. 9) for the blockchain ledger 224 (shown in FIG. 2).

In the exemplary embodiment, IM computer device 410 may store 1305 a plurality of insurance contracts 222. Each insurance contract may be in a blockchain structure. And a plurality of nodes 910 (shown in FIG. 9) store copies of insurance contract 222 in the blockchain structure, such as blockchain ledger 224 (shown in FIG. 2), as described above. IM computer device 410 may receive an update to one of the plurality of insurance contracts 222. IM computer device 410 may generate a new block including the update for insurance contract 222 associated with the update to be added to the blockchain structure. IM computer device 410 may transmit the new block to each of the plurality of nodes 910 that are storing the associated insurance contract 222, so that each receiving node 910 will update the associated insurance contract 222.

Exemplary Computer Device

Figure 14:
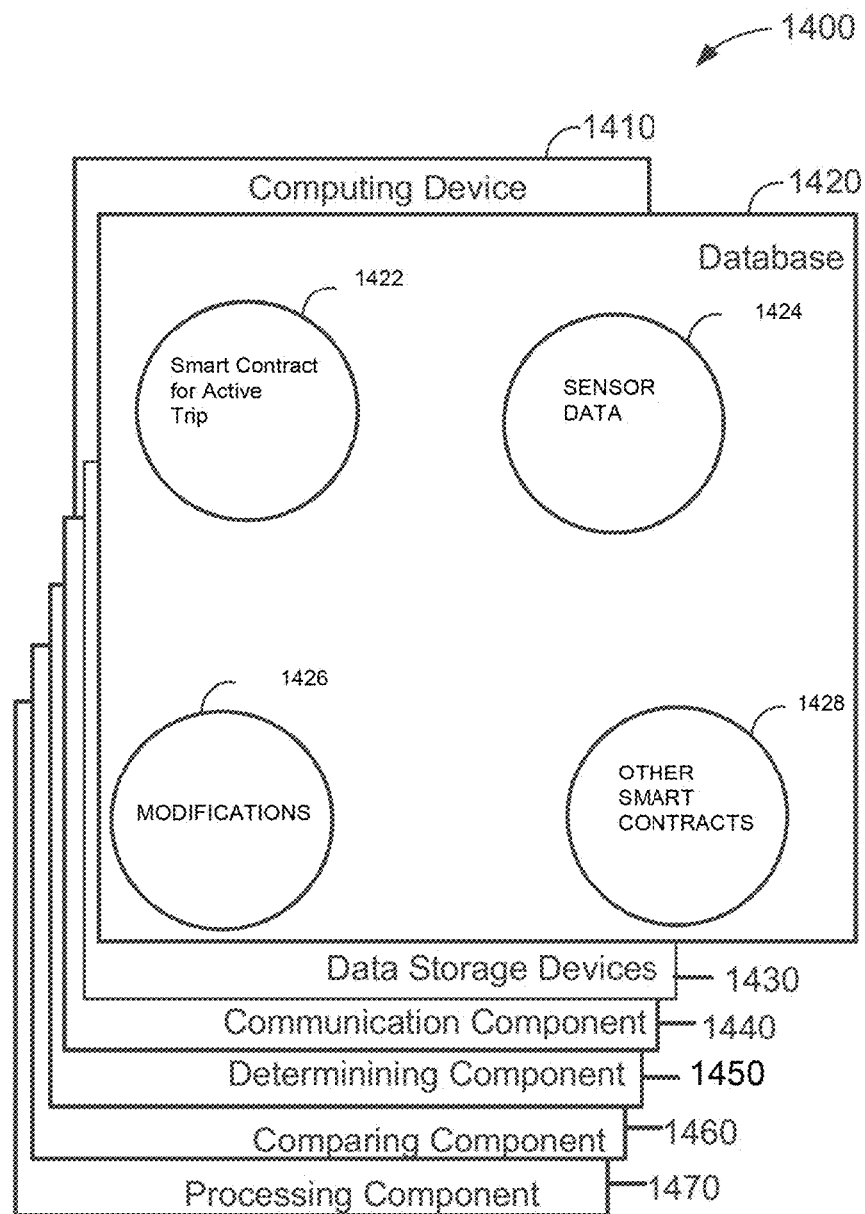
FIG. 14 illustrates a diagram of components of one or more exemplary computing devices that may be used in the system shown in FIG. 4.

FIG. 14 depicts a diagram 1400 of components of one or more exemplary computing devices 1410 that may be used in system 400 shown in FIG. 4. In some embodiments, computing device 1410 may be similar to IM computer device 410 and/or UBAIM server 220 (both shown in FIG. 2). Database 1420 may be coupled with several separate components within computing device 1410, which perform specific tasks. In this embodiment, database 1420 may include the smart contract for the active trip 1422, sensor data 1424, modifications to the smart contract 1426, and/or other smart contracts 1428. In some embodiments, database 1420 is similar to database 420 (shown in FIG. 4).

Computing device 1410 may include the database 1420, as well as data storage devices 1430. Computing device 1410 may also include a communication component 1440 for receiving 310 sensor information and transmitting 325 a notification of driver compliance (both shown in FIG. 3). Computing device 1410 may further include a determining component 1450 for determining 320 whether the driver complied with the one or more terms (shown in FIG. 3). Moreover, computing device 1410 may include a comparing component 1460 for comparing 315 the received sensor information (shown in FIG. 3). A processing component 1470 may assist with execution of computer-executable instructions associated with the system.

EXEMPLARY EMBODIMENTS & FUNCTIONALITY

In one aspect, a computer system for managing usage-based insurance may be provided. The computer system may include at least one processor in communication with at least one memory device. The at least one processor may be configured or programmed to: (1) store an insurance contract for a currently occurring or approaching trip, where the insurance contract is for a driver of a vehicle to insure the driver during the currently occurring or approaching trip, and where the insurance contract includes one or more terms, conditions, obligations, premiums, deductibles, limitations, and/or other clauses; (2) receive sensor information from one or more sensors associated with the vehicle and/or drivers/passengers; (3) compare the received sensor information with the one or more terms, conditions, etc. of the insurance contract; (4) determine whether the driver complied with the one or more terms, conditions, etc. based upon the comparison; and (5) if the determination is that the driver complied with the one or more terms, conditions, etc. the processor is further programmed to: (a) transmit a notification of driver compliance to an insurance server associated with the insurance contract; and (b) store the notification of driver compliance in the insurance contract.

A further embodiment may be where the insurance contract may be in a blockchain structure. In this further embodiment, a plurality of nodes may store copies of the insurance contract in the blockchain structure.

The computer system may achieve the above results by generating a new block for the insurance contract based upon the notification of driver compliance. The computer system may also generate a new block for the insurance contract that includes sensor information on a periodic basis.

A further enhancement may be where the computer system may receive an indication of a lower premium and/or higher discount for the insurance contract from the insurance server. The computer system may then store the indication in the insurance contract. The computer system may also generate a new block for the insurance contract based upon the indication of the lower premium and/or higher discount to facilitate rewarding risk averse drivers, vehicle operations, and/or autonomous vehicle operation.

The computer system may achieve the above results by displaying the indication of the lower premium and/or higher discount of the insurance contract to the driver including an acknowledgement request, receiving the acknowledgement from the driver, and storing the acknowledgement in the insurance contract. The computer system may also generate a new block for the insurance contract based upon the acknowledgement.

The computer system may also achieve the above results by generating a new block for the insurance contract based upon the notification, the indication, and/or the acknowledgement. The computer system may include additional, less, or alternate functionality, including that discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the mobile device, driver, and/or vehicle from device details, mobile device sensors, geolocation information, image data, and/or other data.

Based upon these analyses, the processing element may learn how to identify characteristics and patterns that may then be applied to analyzing sensor data, authentication data, image data, mobile device data, and/or other data. For example, the processing element may learn, with the user's permission or affirmative consent, to identify the type of trip that is planned based upon minimal information or despite a misclassification by a user. The processing element may also learn how to identify different types of routes and/or driver behaviors based upon differences in the received sensor data.

ADDITIONAL EXEMPLARY EMBODIMENTS

In still another aspect, a computer system for managing usage-based insurance may be provided. The computer system may include at least one processor, sensor, and/or transceiver in communication with at least one memory device, the at least one processor, sensor, and/or transceiver. The at least one processor may be programmed to (1) store an insurance contract for a currently occurring or impending trip, where the insurance contract is for a driver of a vehicle to insure the driver and/or vehicle during the currently occurring or impending trip, and where the insurance contract includes one or more terms, conditions, obligations, premiums, discounts, limitations, deductibles, miles allowed, and/or other clauses; (2) receive, from the driver, a requested modification of at least one of the one or more terms, conditions, etc. of the insurance contract; (3) transmit the requested modification to an insurance server associated with the insurance contract; (4) receive a response to the request from the insurance server; and/or (5) store the response in the insurance contract. The system may include additional, less, or alternate functionality, including that discussed elsewhere herein.

A further embodiment may be where the response includes one or more additional terms. The computer system may also display the one or more additional terms, conditions, etc. to the driver for approval, receive approval of the one or more additional terms from the driver, and store the one or more additional terms in the insurance contract.

A further enhancement may be where the insurance contract is in a blockchain structure. In this enhancement a plurality of nodes store copies of the insurance contract in the blockchain structure.

The computer system may achieve the above results by generating a new block for the insurance contract based upon the requested modification and the response and updating the insurance contract with the new block. The computer system may also transmit the new block the plurality of nodes, where each the plurality of nodes are configured to update their stored copies of the insurance contract with the new block.

A further enhancement may be where the computer system may transmit the requested modification and the response to the plurality of nodes, where each of the plurality of nodes may be configured to generate a new block based upon the requested modification and the response, and update their stored copies of the insurance contract with the generated block.

A further enhancement may where the computer system is associated with the vehicle, and where the plurality of nodes include a plurality of computer devices each associated with one of a plurality of vehicles (such as autonomous or semi-autonomous vehicles).

A still further enhancement may be where the insurance server is one of the plurality of nodes.

In yet another aspect, a computer system for managing usage-based insurance may be provided. The computer system may include at least one processor, sensor, server, and/or transceiver in communication with at least one memory device and/or the at least one processor, sensor, server, and/or transceiver. The at least one processor may be programmed to (1) receive a user request for trip insurance, where the user request includes a plurality of information about the user, the vehicle, and the trip; (2) transmit the user request to an insurer auction network, where the insurer auction network includes a plurality of insurers; (3) receive, from the insurer auction network, a plurality of bids from a plurality of insurers for insurance for the trip; (5) display the plurality of bids to the user; (6) receive a user selection of a bid of the plurality of bids; (7) transmit the user selection to the insurer auction network; and (8) store an electronic or smart insurance contract (associated with providing the trip insurance) based upon the selected bid in a blockchain structure, the blockchain structure associated with insurance for the user, a vehicle driver, a vehicle passenger, and/or the vehicle itself (such as an autonomous vehicle).

A further enhancement may be where the computer system generates the insurance contract based upon the user request and the selected bid. A further enhancement may be where the computer system receives the insurance contract from an insurance server associated with the selected bid. A still further enhancement may be where the insurance contract is in a blockchain structure, and/or a plurality of nodes may store copies of the insurance contract in the blockchain structure.

In yet another aspect, a computer system for managing usage-based insurance may be provided. The computer system may include at least one processor, sensor, and/or transceiver in communication with at least one memory device, the at least one processor, sensor, and/or transceiver. The at least one processor may be programmed to (1) store a plurality of insurance contracts, where each insurance contract is in a blockchain structure, and where each of the plurality of insurance contracts are also stored on a plurality of nodes; (2) receive an update to one of the plurality of insurance contracts; (3) generate a new block including the update for the insurance contract associated with the update to be added to the blockchain structure; and (4) transmit the new block to each of the plurality of nodes that are storing the associated insurance contract, so that each receiving node will update the associated insurance contract.

Exemplary Usage-Based Insurance Embodiments

The emerging risk of users not being tied to specific vehicles presents challenges to insurers to quantify and thereby offer appropriately priced coverage to this sector. The competitive advantage lies in entering this market in its infancy and employing a Usage-Based Insurance (UBI) solution to gather valuable data and gain actuarial experience in the vehicle independent UBI market. Onboard sensors collect information which may provide valuable insight on the driver's behavior.

The UBI solution may require users to file for a policy and a quote for every individual trip that the user plans. As the user only pays for the trips that the user has performed, the user is only paying for use of the vehicle and not for the time when the user is not using a vehicle. In some embodiments, the UBI solution may also be known as a pay as you go or pay as you drive solution. The UBI solution may provide for providing insurance coverage for individual or particular trips based upon type of trip, vehicle in question, route characteristics, driver qualifications and history, etc. as discussed elsewhere herein.

The present embodiments may employ a UBI solution to gather valuable data and gain actuarial experience in the UBI market. Auto sensor data may be collected and used for rating purposes. The present embodiments may also establish improved restrictions and guidelines for operations of a vehicle while the user is covered under a specific insurance policy.

In the present embodiments, the UBI solution may generate variable quotes for trips based upon a variety of factors, such as, but not limited to, type of trip, vehicle in question, route characteristics, driver qualifications, driver history, driver vehicle, and/or driver features (such as autonomous or semi-autonomous features and systems). Other factors, such as, but not limited to, how often the individual driver and/or an autonomous vehicle takes trips to the particular location, and/or the amount of experience that the individual operator has with that particular type of vehicle may affect the price of the quote as well.

In some further embodiments, a collection of sensor information from vehicles that the driver has driven may also include information about whether the driver is a safe driver or just been lucky so far. Safety issues may include, but are not limited to, speeds, passing distances, stoplight behavior, any accidents in the past, past damage claims, traffic violations, and other factors that may allow the systems described here to determining the potential risks with this driver.

Further Considerations

Usage-based auto insurance (per-trip or for a time duration—hour, week, day, month, year) auto insurance will likely become an important auto insurance feature in the future. A usage based system can draw upon blockchain technology and an auction system, to allow drivers to submit a bid request (for a trip or time duration) to multiple insurance carriers for auto insurance coverage.

There is currently not a known technology that allows a multi-carrier auction mechanism for usage based auto insurance that allows transparency and trusted data integrity. Part of this may be the nature of company database systems— they are located in one company, and no third party has designed multi-party auction system probably due to the complexity of actuarial and underwriting, as well as working with each insurance carrier.

Advances in mapping technologies, GPS, available data feeds from government regarding road construction activity, weather, traffic, etc. makes it possible to consider these variables now in underwriting a per-usage (time or trip) auto insurance coverage.

One of the advantages of the system described in this disclosure is that it allows for a driver to use an in-vehicle computer system to request an auto insurance coverage bid to various participating insurance carriers (carriers can opt-in according to some set criteria, or be pulled from a list of the insured's preferred insurers). It is assumed that a driver and vehicle combination has been "cleared" or approved by an insurance provider or a clearinghouse organization that my approve driver/vehicle combinations for insurance companies (possibly using driver history, vehicle attributes, other demographic information).

The bid request is sent to a group of carriers from the vehicle wirelessly via internet, with route information, vehicle, driver, time, etc. The insurer uses standard underwriting models integrating all data available (vehicle, driver, time, date, route, traffic, etc.) to derive a bid price for coverage. This bid is sent back to the vehicle/driver for consideration, with stipulations (such as time limitations, speed limit considerations, specific route and deviance from route). Multiple bids may come in from multiple carriers, and the driver or vehicle accepts a bid with the stipulations.

Note that this assumes in some cases a vehicle may act independently, based upon preferences by the owner or insured, to be able to accept bids and remit payment for an insurance coverage usage window (time or trip). The funds for premium may be contained in a driver, owner, or vehicle "wallet" with cryptocurrency (such as Bitcoin, Ether, proprietary insurer e-coin, etc.). This bid is written into a smart contract with price, stipulations, and all associated data (vehicle/driver, time, route, etc.) with the cryptocurrency payment (Bitcoin, Ether, any proprietary insurance company coin, etc.). The data is sent to the blockchain participant miners or block chain participant company (federation) and the data is added to a block in the blockchain. The data encoded in the blockchain is then a part of the record (immutable) and shared with all participating insurance carriers (as well as the winning bid insurance carrier).

The blockchain manager handles the data inside the insurance company firewall, and handles stipulations and termination of coverage (and via a messaging manager can communicate to the vehicle onboard display to notify driver or vehicle of potential lack of compliance with terms and conditions or to notify driver or vehicle of an earned discount). The details of bid acceptance and termination would be visible to all drivers/owners and insurers in the network (public), and this would aid in transparency for insurance coverage and liability (a driver could not claim insurer A provided coverage when it was clearly insurer B).

As described in detail above, the system includes (1) a multi-carrier auction; (2) per usage auto insurance coverage (time or trip, according to the insured's preferences); (3) automatic remittance of premium to insurer at start of trip, from driver/owner/vehicle wallet; and (4) clear, shared, unchangeable record detailing time and route of coverage with stipulations. The coverage window may be clearly stated in smart contract.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A computer system for generating and managing usage-based insurance contracts using blockchains, the computer system including at least one processor in communication with at least one memory device, the at least one processor is programmed to:
    store a smart insurance contract for a current trip, wherein the smart insurance contract is for insuring at least one of a rider of a vehicle and the vehicle itself during the current trip, wherein the smart insurance contract includes one or more terms, wherein the smart insurance contract is stored in a first block in a blockchain structure along with a digital signature based on a vehicle identifier, and wherein a plurality of nodes each store a copy of the smart insurance contract in the blockchain structure;
    receive, from the rider, a requested modification of at least one of the one or more terms of the smart insurance contract;
    transmit the requested modification to an insurance server associated with the smart insurance contract;
    receive a response to the requested modification from the insurance server; and
    store the response in a second block of the blockchain structure along with the smart insurance contract to facilitate providing usage-based trip insurance for the at least one of the rider and the vehicle in a transparent manner, wherein the second block is subsequent to the first block, and wherein the response includes the digital signature and the vehicle identifier to associate the response with the smart insurance contract.

2. The computer system of claim 1, wherein the smart insurance contract is at least one of an electronic insurance contract and a virtual insurance contract, and wherein the current trip is a currently occurring trip or an impending trip.

3. The computer system of claim 1, wherein the rider of the vehicle includes at least one of a driver of the vehicle and a non-driver, passenger of the vehicle, and wherein the vehicle is at least one of an automobile, an autonomous vehicle, and a semi-autonomous vehicle.

4. The computer system of claim 1, wherein the one or more terms of the smart insurance contract include at least one of: conditions, obligations, duties, limitations, driver limitations, vehicle operation limitations, time-of-day operation limitations, number of miles limitations, weather limitations, road condition limitations, autonomous vehicle operation limitations, premiums, discounts, and other clauses.

5. The computer system of claim 1, wherein the processor is further programmed to:
    receive a user request from at least one of the rider of the vehicle and the vehicle itself for insurance coverage for the current trip;
    transmit the user request to an insurer auction network, wherein the insurer auction network includes a plurality of insurers each associated with an insurer computing device;
    receive, from the insurer auction network, a plurality of bids from the plurality of insurers for providing the insurance coverage for the current trip; and
    receive a selection of a bid of the plurality of bids from at least one of the rider of the vehicle and the vehicle itself for insurance coverage for the current trip, the insurance coverage being memorialized in the smart insurance contract.

6. The computer system of claim 1, wherein the response includes one or more additional terms, and wherein the processor is further programmed to:
    display the one or more additional terms to the rider for approval;
    receive approval of the one or more additional terms from the rider; and
    store the one or more additional terms in a third block of the blockchain structure along with the smart insurance contract, wherein the third block is subsequent to the second block.

7. The computer system of claim 1, wherein the response includes one or more additional terms, wherein the processor is further programmed to:
    display the one or more additional terms to the rider for approval;
    receive approval of the one or more additional terms from the rider;
    automatically update the smart insurance contract with the approved additional terms; and
    store the updated smart insurance contract in a third block of the blockchain structure, wherein the third block is subsequent to the second block.

8. The computer system of claim 1, wherein the processor is further programmed to:
    generate a third block of the blockchain structure in response to the requested modification and the response;
    update the smart insurance contract with the response to the requested modification; and
    store the updated smart insurance contract in the third block, wherein the third block is subsequent to the second block.

9. The computer system of claim 8, wherein the processor is further programmed to transmit the third block to the plurality of nodes, wherein each of the plurality of nodes are configured to update their respective stored copy of the smart insurance contract with the third block.

10. The computer system of claim 1, wherein the processor is further programmed to transmit the requested modification and the response to each of the plurality of nodes, wherein each of the plurality of nodes are configured to generate a third block in response to the requested modification and the response, and update their respective stored copy of the smart insurance contract with the third block.

11. The computer system of claim 1, wherein the computer system is associated with the vehicle, and wherein the plurality of nodes includes a plurality of computer devices each associated with one of a plurality of vehicles.

12. The computer system of claim 1, wherein the insurance server is one of the plurality of nodes.

13. A computer-implemented method for generating and managing usage-based insurance contracts using blockchains, the method implemented on an insurance monitoring ("TM") computer system including at least one processor in communication with at least one memory device, the method comprising:
    storing a smart insurance contract for a current trip, wherein the smart insurance contract is for insuring at least one of a rider of a vehicle and the vehicle itself during the current trip, wherein the smart insurance contract includes one or more terms, and wherein the smart insurance contract is stored in a first block in a blockchain structure along with a digital signature based on a vehicle identifier, and wherein a plurality of nodes each store a copy of the smart insurance contract in the blockchain structure;
    receiving, from the rider, a requested modification of at least one of the one or more terms of the smart insurance contract;
    transmitting, by the TM computer system, the requested modification to an insurance server associated with the smart insurance contract;
    receiving, at the IM computer system, a response to the requested modification from the insurance server; and
    storing, in memory, the response in a second block of the blockchain structure along with the smart insurance contract to facilitate timely providing of usage-based trip insurance for the at least one of the rider and the vehicle in a transparent manner, wherein the second block is subsequent to the first block, and wherein the response includes the digital signature and the vehicle identifier to associate the response with the smart insurance contract.

14. The computer-implemented method of claim 13, wherein the smart insurance contract is at least one of an electronic insurance contract and a virtual insurance contract, and wherein the current trip is a currently occurring trip or an impending trip.

15. The computer-implemented method of claim 13, wherein the rider of the vehicle includes at least one of a driver of the vehicle and a non-driver, passenger of the vehicle, and wherein the vehicle is at least one of an automobile, an autonomous vehicle, and a semi-autonomous vehicle.

16. The computer-implemented method of claim 13, wherein the method further comprises:
    receiving a user request from at least one of the rider of the vehicle and the vehicle itself for insurance coverage for the current trip;
    transmitting, from the IM computer system, the user request to an insurer auction network, wherein the insurer auction network includes a plurality of insurers each associated with an insurer computing device;
    receiving, by the IM computer system from the insurer auction network, a plurality of bids from the plurality of insurers for providing the insurance coverage for the current trip; and
    receiving, by the IM computer system, a selection of a bid of the plurality of bids from at least one of the rider of the vehicle and the vehicle itself for insurance coverage for the current trip, the insurance coverage being memorialized in the smart insurance contract.

17. The computer-implemented method of claim 13, wherein the response includes one or more additional terms, and wherein the method further comprises:
    displaying the one or more additional terms to the rider for approval;
    receiving approval of the one or more additional terms from the rider; and
    storing the one or more additional terms in a third block of the blockchain structure along with the smart insurance contract, wherein the third block is subsequent to the second block.

18. The computer-implemented method of claim 13, wherein the response includes one or more additional terms, wherein the method further comprises:
    displaying the one or more additional terms to the rider for approval;
    receiving approval of the one or more additional terms from the rider;
    automatically updating the smart insurance contract with the approved additional terms; and
    storing the updated smart insurance contract in a third block of the blockchain structure, wherein the third block is subsequent to the second block.

19. The computer-implemented method of claim 13, wherein the method further comprises:
    generating a third block of the blockchain structure in response to the requested modification and the response;
    updating the smart insurance contract with the response to the requested modification; and
    storing the updated smart insurance contract in the second block, wherein the third block is subsequent to the second block.

20. The computer-implemented method of claim 19, wherein the method further comprises transmitting the third block to the plurality of nodes, wherein each of the plurality of nodes are configured to update their respective stored copy of the smart insurance contract with the third block.

21. The computer-implemented method of claim 13, wherein the method further comprises transmitting the requested modification and the response to each of the plurality of nodes, wherein each of the plurality of nodes are configured to generate a third block in response to the requested modification and the response, and update their respective stored copy of the smart insurance contract with the third block.

* * * * *